(12) United States Patent
Steenstrup

(10) Patent No.: US 11,181,091 B2
(45) Date of Patent: Nov. 23, 2021

(54) WAVE ENERGY CONVERSION SYSTEM AND A METHOD FOR GENERATING ELECTRICAL POWER FROM A WAVE ENERGY

(71) Applicant: RESEN WAVES APS, Kgs. Lyngby (DK)

(72) Inventor: Per Resen Steenstrup, Nordhavn (DK)

(73) Assignee: RESEN WAVES APS, Kgs. Lyngby (DK)

( * ) Notice: Subject to any disclaimer, the term of this patent is extended or adjusted under 35 U.S.C. 154(b) by 216 days.

(21) Appl. No.: 16/332,613

(22) PCT Filed: Sep. 12, 2017

(86) PCT No.: PCT/EP2017/072790
§ 371 (c)(1),
(2) Date: Mar. 12, 2019

(87) PCT Pub. No.: WO2018/050604
PCT Pub. Date: Mar. 22, 2018

(65) Prior Publication Data
US 2020/0011289 A1   Jan. 9, 2020

(30) Foreign Application Priority Data

Sep. 14, 2016   (DK) .............................. PA201670704

(51) Int. Cl.
*F03B 13/26* (2006.01)
*F03B 13/18* (2006.01)
*F03B 13/20* (2006.01)

(52) U.S. Cl.
CPC ........ *F03B 13/264* (2013.01); *F03B 13/1815* (2013.01); *F03B 13/20* (2013.01)

(58) Field of Classification Search
CPC .... F03B 13/264; F03B 13/1815; F03B 13/20; F03B 13/1885; F03B 13/14; Y02E 10/30; F05B 2240/93
(Continued)

(56) References Cited

U.S. PATENT DOCUMENTS 4,208,877 A * 6/1980 Evans ................. F03B 13/1885
60/495
4,851,704 A * 7/1989 Rubi ....................... F03B 13/20
290/53

(Continued)

FOREIGN PATENT DOCUMENTS

| CA | 2753055 A1 | 8/2010 |
|----|-----------|--------|
| CN | 101680418 A | 3/2010 |

(Continued)

OTHER PUBLICATIONS

Chinese Office Action dated Mar. 20, 2020, CN Application No. 2017800541930, 11 pages (including translation).

*Primary Examiner* — Charles Reid, Jr.
*Assistant Examiner* — Charles H Reid
(74) *Attorney, Agent, or Firm* — MH2 Technology Law Group LLP

(57) ABSTRACT

A wave energy conversion system has a float and a power generation drum with a drum housing rotationally attached to the float by a shaft attachment. The shaft attachment allows a rotational movement of the drum housing and the float relative to each other. The drum housing holds a cable reel with a cable having a first end part connected to the cable reel and a second end part, where the cable reel is an integral part of or connected to the drum housing to rotate with the drum housing. The float can be positioned in the sea by having the second end part of the cable attached to a submerged structure or to the sea bed. When the float is positioned in the sea, the float may be moved by the waves, (Continued)

which movements cause a rotational movement of the drum housing with electric power being generated.

44 Claims, 12 Drawing Sheets

(58) Field of Classification Search
USPC .................................................... 290/53, 42
See application file for complete search history.

(56) References Cited

U.S. PATENT DOCUMENTS

| | | | |
|---|---|---|---|
| 2007/0089409 | A1 | 4/2007 | Serrano |
| 2008/0272600 | A1 | 11/2008 | Olson |
| 2009/0146429 | A1* | 6/2009 | Protter ................... F03B 13/20 290/53 |
| 2009/0200806 | A1* | 8/2009 | Al-Huwaider ...... F03B 13/1865 290/53 |
| 2011/0018275 | A1 | 1/2011 | Sidenmark |
| 2011/0173968 | A1* | 7/2011 | Ahdoot ............... F03B 13/1865 60/507 |
| 2012/0013127 | A1* | 1/2012 | Shpinev ................... F03B 13/20 290/53 |
| 2012/0200156 | A1* | 8/2012 | Weller .................... F03B 13/14 307/21 |
| 2013/0067903 | A1* | 3/2013 | Murtagh ................. F03B 13/20 60/505 |
| 2014/0035286 | A1* | 2/2014 | Nozawa ............. F03B 13/1845 290/53 |
| 2014/0265339 | A1* | 9/2014 | Dehlsen ............. F03B 13/1845 290/53 |

FOREIGN PATENT DOCUMENTS

| | | |
|---|---|---|
| CN | 102016294 A | 4/2011 |
| CN | 102959235 A | 3/2013 |
| SE | 532074 C2 | 10/2009 |
| WO | 2010/044674 A2 | 4/2010 |

* cited by examiner

WAVE ENERGY CONVERSION SYSTEM AND A METHOD FOR GENERATING ELECTRICAL POWER FROM A WAVE ENERGY

CROSS REFERENCE TO RELATED APPLICATIONS

This application is a U.S. National Stage entry of PCT/EP2017/072790, filed Sep. 12, 2017, which claims priority to DK Application No. PA201670704, filed Sep. 14, 2016, the contents of all of which are hereby incorporated by reference in their entirety.

TECHNICAL FIELD

The disclosure relates to a wave energy conversion system and a method for generating electrical power from wave action.

BACKGROUND

U.S. Pat. No. 7,444,810 discloses a wave energy conversion system in the form of a lever operated pivoting float that transforms the rise and fall of waves to different forms of energy. The system comprises a float pivotally attached to a first end of a lever arm with the float in a first horizontal position on the sea and the lever arm in a first position with a second end of the lever arm oriented upward out of the ocean and wherein the float and lever arm can both change to a vertical position and be submerged in the ocean. The system comprises a spring component that returns the lever arm to its first position. The float has a centre opening allowing passage of a second end of the lever arm, and the second end of the lever arm is attached to a the sea bed with a fixed length cable wherein the pivoting float and lever arm can change orientation to the submerged stable object. The system also comprises a generator in the float that is powered by the pivoting motion of the lever arm turning a rotating shaft, whereby electrical power is produced by the rise and fall of the waves.

US 2008/0272600 discloses a further development of the system disclosed in U.S. Pat. No. 7,444,810. For the system disclosed in US 2008/0272600, the lever arm is substituted by a lever arm pod or casing, where the electrical generator is arranged with the lever arm pod, and where a torsion spring system is also arranged in the lever arm pod for returning the lever arm pod to its start position during movement of the float by the rise and fall of the waves.

For the systems disclosed in U.S. Pat. No. 7,444,810 and US 2008/0272600, the second end of the lever arm is attached to the sea bed with a cable of a fixed length, and the position of the float within the sea will vary with changing tides, whereby the float will be more or less submerged into the sea, reducing the overall energy conversion efficiency of the float.

US 2011/0018275 discloses a wave energy converter including a buoy and a transmission unit. The buoy has on its bottom side protruding stays, which constitutes a frame, and a driveshaft is journalled at its two ends to the stays. A winding anchor drum is mounted to rotate about the driveshaft, and an anchor line winds around the winding anchor drum with the exterior end of the anchor line attached to a foundation on the sea bed. During the movements of the waves the distance between the buoy and the bottom foundation varies. The anchor drum is turned, due to the coupling with the anchor line, in a first direction when the water surface rises, and is then locked to the driveshaft, which thereby is rotated by the anchor drum. When the water surface at the buoy sinks, the driveshaft is locked from rotating backwards in the opposite direction by anti-reverse mechanisms in the shaft stays. The driveshaft is in turn connected to a generator. The coupling between the driveshaft and the generator can in one embodiment comprise a mechanical gear, which e.g. has a fixed teeth relation or fixed gear ratio, and which gears up the rotation speed of the generator. To be capable of turning the anchor drum backwards, in a second, opposite direction, and to keep the anchor line in a tensed state when the water level at the buoy sinks, a return feed mechanism of some kind sort is required, and in one embodiment the return feed mechanism is a coil spring. The inner end of the coil spring is fixedly mounted to one of the stays, with the outer end of the coil spring mounted to the casing of the gear, which rotates with the driveshaft, which again rotates with the anchor drum.

US 2007/0089409 discloses an energy generating system using sea waves. The system comprises a unit with a moving housing mounted in rotating fashion in relation to a horizontal static shaft, where the horizontal shaft is mounted to a structure. A connecting cable winds around the moving housing with the exterior end of the cable connected to an intermediate buoy, which is connected to the sea bed by a ballast chain. The system has an energy recovery device in the form of a coil spring with the interior end of the spring connected to the static shaft and with the exterior end of the spring attached to the interior of the moving housing. The coil spring is fitted with a certain pre-tensioning in order to ensure the tension of the ballast chain and of the connecting cable, and has the task of rewinding the cable on the housing, when the unit as a whole descends with the movement of the wave.

Both systems disclosed in US 2011/0018275 and US 2007/0089409 has a cable wound on a winding drum housing, where the cable at its exterior end is directly or indirectly connected to the sea bed. Both systems has a coil spring with one end fixedly attached to a frame and with the other end connected to the winding drum housing or a gear connected to the winding drum housing, whereby the coil spring acts to rewind the cable on the winding drum housing when the drum housing descends with the movement of the wave. When installing the system disclosed in US 2007/0089409 in the sea, the coil spring is fitted with a certain pre-tensioning in order to ensure the tension of the connecting cable. However, the position of the system within the sea will vary with changing tides, whereby the tensioning of the cable will vary with changing tides, reducing the overall energy conversion efficiency of the float.

It would be advantageous to have a wave energy conversion system, which can be adjusted to operate at different sea levels, which may be caused by changing tides.

SUMMARY

It is an object of the invention to provide an adjustable wave energy conversion system, which can operate at different sea levels.

This object is achieved in accordance with a first aspect by providing a wave energy conversion system comprising:
   a float and a power generation drum with a drum housing rotationally attached to the float by a shaft attachment, wherein the shaft attachment allows an at least partially rotational movement of the drum housing and the float relative to each other, and wherein the drum housing comprises a cable reel with a cable having a first end part connected to the cable reel and a second end part, said cable reel being an integral part of or connected to the drum housing to rotate with the drum housing.

In an embodiment the power generation drum comprises an electrical generator arranged within the drum housing for rotating or turning in response to a rotational movement of the drum housing.

In an embodiment the shaft attachment is fixedly connected to the float, and the drum housing is rotationally connected to the shaft attachment by a watertight connection.

In an embodiment the float is positioned in the sea by having a second end part of the cable attached to a submerged structure or to the sea bed.

By having the cable, which may be used to connect the float to the sea bed, attached to the float by a cable reel secured to the drum housing, the length of the cable can easily be adjusted by rotation of the drum housing resulting in a winding or unwinding of cable on the cable reel. Thus, the length of the cable may be adjusted to follow a change in the sea level, whereby the float can be positioned in the sea for maximum energy conversion. In an embodiment the drum housing comprises a cylindrical drum part with two oppositely arranged side lids.

In an embodiment the shaft attachment comprises two shaft parts, a first and a second shaft part, with each shaft part having one end fixedly connected to the float and the other end arranged within the drum housing with the axis of each shaft part following the centre axis of the drum housing, wherein the arrangement of the shaft parts within the drum housing allows a rotation of the drum housing relative to the shaft parts.

In an embodiment the first shaft part has a first end fixedly connected to the float and the other end supported on the inner side of a first side lid of the drum housing with one or more ball bearings, which may be a double set of ball bearings, and the second shaft part has a first end fixedly connected to the float and the other end supported on the inner side of a second side lid of the drum housing with one or more ball bearings, which may be a double set of ball bearings.

In an embodiment the shaft attachment is fixedly connected to the float within an opening of the float and the drum housing is rotationally arranged on the shaft attachment within said opening.

In an embodiment the float comprises two oppositely arranged arms defining a part of said opening with the shaft attachment fixedly connected to the two arms.

In an embodiment the float comprises a front part connecting the two arms, and the shaft attachment is connected to the two arms with the drum housing rotationally arranged within said two arms. The front part may connect the first opposed end parts of the two arms.

In an embodiment the float is substantially "U" shaped.

In an embodiment the front part or front end of the float has a curved shape.

In an embodiment the back part or parts opposite the front part of the float have a curved shape.

In an embodiment the arms of the float has a curved shape.

In an embodiment the front part has an outer surface facing away from the drum, the combined drum and float has a centre of gravity, and the centre of the drum is located at a distance to the outer surface of the front part being larger than the distance from the gravity centre to the outer surface of the front part.

In an embodiment the distance from the centre of the drum to the centre of gravity is at least 5% of the total length of the float when measured in the direction of the arms.

In an embodiment the distance from the centre of the drum to the centre of gravity is no more than 30% or no more than 20% of the total length of the float when measured in the direction of the arms.

In an embodiment the cable reel has a radius being larger than the distance between the centre of the drum and the centre of gravity.

In an embodiment, then when the float is positioned in a substantially horizontal position on the sea, the cable extends from the cable reel to reach the submerged structure with the cable facing the front part of the float.

In an embodiment the drum is configured for winding up the cable on the cable reel in order to obtain a tension or pre-tension, which may be a predetermined tension or pre-tension, of the cable when the float is positioned in the sea by having a second end part of the cable attached to a submerged structure.

In an embodiment the drum housing comprises a spring system, which spring system comprises a torsion spring with a first end part non-rotationally connected to the shaft attachment and a second end part operatively connected to the drum housing, and where for at least one connection mode of operation, a rotation of the drum house builds up a tension in the spring, thereby applying a torque to the shaft attachment.

In an embodiment the second end part of the torsion spring is configured for being operatively connected to the drum housing in a first mode of operation to build up a tension in the spring by rotation of the drum housing in a direction for unwinding the cable from the cable reel, and to rotate the drum housing in the opposite direction for winding up the cable on the cable reel by a release in the tension of the spring.

In an embodiment the torsion spring is operatively connected to the drum housing for shifting between the first mode of operation and a second mode of operation, wherein for the second mode of operation the second end part of the spring is operatively connected to the drum housing for building up a tension in the spring by rotation of the drum housing in a direction for winding up the cable on the cable reel.

In an embodiment the drum housing comprises a spring system and a gear system, which spring system comprises a torsion spring with a first end non-rotationally connected to the shaft attachment and a second end operatively connected to the drum housing via the gear system, said gear system configured for being in a first, non-rotational mode of operation with the second end of the torsion spring held in a fixed position relative to the drum housing, and for being in a second, rotational mode of operation, in which the gear system is configured for rotating the drum house relative to the shaft attachment and relative to the second end of the torsion spring.

In an embodiment when in the rotational mode of operation, the gear system is configured for rotating the drum housing in a first direction relative to the shaft attachment for winding up the cable on the cable reel, and when a force is exerted on the cable reel and drum housing from a tension in the cable, said gear system is further configured for rotating the second end of the torsion spring in a second direction opposite to the first direction relative to the shaft attachment, said rotation of the second end of the torsion spring building up a tension in the spring and a torque to the shaft attachment.

In an embodiment the gear system comprises a disc system with the second end of the torsion spring secured to said disc system, wherein the disc system is rotationally arranged relative to the shaft attachment and the drum housing, and wherein an outer peripheral part of the disc system holds a motor with a rotation axle, said rotation axle holding a first gear wheel engaging a second gear wheel fixedly connected to the drum housing, whereby a rotation of said motor axle rotates the drum housing and the disc system holding the second end of the spring in opposite directions relative to each other.

It is within one or more embodiments that when the motor axle rotates in a first direction, the drum housing rotates in a first direction relative to the shaft attachment for winding up the cable on the cable reel, and when a force is exerted on the cable reel and drum housing from a tension in the cable, the disc system holding the second end of the spring rotates in a second direction opposite to the first direction relative to the shaft attachment, said rotation of the second end of the torsion spring building up a tension in the spring and a torque to the shaft attachment.

The torque on the shaft attachment is a function of the force exerted by the tension of the spring, which again is a function of the tension of the cable on the cable reel and drum housing. Thus, the tension of the cable can be determined as the torque on the shaft attachment divided by the radius of the cable reel.

It is within one or more embodiments that when the gear system is in the non-rotational mode of operation with the second end of the torsion spring held in a fixed position relative to the drum housing, the second end of the torsion spring follows a rotation of the drum housing, whereby a rotation of the drum housing in a direction of unwinding the cable from the cable reel builds up a tension in the spring and a torque to the shaft attachment.

When placing the float in the sea, a tension or pre-tension should be built up in the cable while at the same time a tension should be built up in the spring. For this purpose, the torsion spring may be operatively connected to the drum housing for operating in the second or rotational mode of operation, in which the gear system is configured for rotating the drum house relative to the shaft attachment and relative to the second end of the torsion spring.

When the float has been positioned in the sea, the float is moved up and down by the waves, which movement may be used to generate electric power. For this purpose, the torsion spring may be operatively connected to the drum housing for operating in the first or non-rotational mode of operation, in which the gear system is configured for holding the second end of the spring in a fixed position relative to the drum housing.

In the first mode of operation, when a wave lift the float, the cable is unwound from the cable reel, and with the second end of the spring hold fixed to the drum housing, the second end of the spring turns with the cable reel while building a further tension in the spring. When the wave goes down again, the tension of the spring winds up the cable on the cable reel.

In the second mode of operation, the gear system may rotate the drum housing with the cable reel and the second end of the spring in opposite directions, whereby when the gear system rotates the drum housing to wind up the cable, the second end of the spring may be rotated with a tension being built up in the spring. Thus, for the first and second mode of operation, the drum housing is rotated in opposite directions when building up a tension in the spring.

In an embodiment the drum comprises a sensor system configured for sensing a torque on the shaft attachment.

In an embodiment the energy conversion system further comprises a control system configured for controlling rotation of the drum housing and winding of the cable reel based on the sensed torque or based at least partly on the sensed torque.

In an embodiment the control system is configured for determining a cable tension based on the sensed torque and for controlling rotation of the drum housing and winding of the cable reel until a predetermined tension or pre-tension is determined for the cable.

In an embodiment, when the float is positioned in the sea, the control system is further configured for determining the tension of the cable during the movement of several waves, comparing the obtained tension values with the predetermined pre-tension, and controlling rotation of the drum housing for winding and/or unwinding the cable on the cable reel for changing the pre-tension in the cable based on said comparison.

In an embodiment the control system is configured for controlling the operational mode of the gear system.

In an embodiment the control system is configured for controlling rotation of the drum housing by controlling the rotation of the motor axle.

In an embodiment the torsion spring is a clock spring, and the disc system comprises two oppositely arranged discs with the clock spring arranged between said two discs.

In an embodiment the second gear wheel is larger than the first gear wheel.

In an embodiment the sensor system comprises a number of strain gauges attached to the shaft attachment within the drum housing.

In an embodiment the electrical generator is arranged for rotating or turning in one direction only.

In an embodiment the power generation drum further comprises a gear drive interconnecting the drum housing and the electrical generator.

In an embodiment the gear drive comprises a speed-up gear. The speed-up gear may speed up the relatively slow rotation of the drum by at least 1:10 or at least 1:20.

In an embodiment the gear drive comprises a unidirectional gear.

In an embodiment the gear drive comprises a one-way clutch.

In an embodiment the electrical generator, the speed-up gear, the unidirectional gear, and the one-way clutch are all centred for rotational movement about an axis defined by the shaft attachment.

In an embodiment the power generation drum further comprises a flywheel operatively connected to the electrical generator.

In an embodiment the drum comprises an angle detecting system configured for determining a rotation angle of the drum housing when the drum housing is turned or rotated around the shaft attachment from a first position to a second position. The first position may be reached when the drum housing stops rotating by unwinding of the cable from the cable reel in response to the float being moved away from the submerged structure by the upward movement of a wave, and the second position may be reached when the drum housing stops rotating in the opposite direction by winding up the cable on the cable reel in response to the float being moved closer to the submerged structure by the following downward movement of the wave.

In an embodiment the control system is further configured for controlling rotation of the drum housing for winding up the cable on the cable reel for submerging the float into the sea, when one or more determined rotation angles equals or exceeds a predetermined rotation angle.

In an embodiment the float is a buoy.

In accordance with a second aspect there is provided a wave energy conversion system comprising:
- a float holding a power generation drum with a drum housing rotationally attached to the float by a shaft attachment, wherein the shaft attachment allows an at least partially rotational movement of the drum housing and the float relative to each other;
- said drum housing comprising:
  - a cable reel with a cable having a first end part and a second end part, said first end part being connected to the cable reel, and said cable reel being an integral part of or connected to the drum housing to rotate with the drum housing;
  - a torsion spring operatively connected to the drum housing in a first mode of operation for building up a tension in the spring by rotation of the drum housing in a direction for unwinding the cable from the cable reel and for rotating the drum housing in the opposite direction for winding up the cable on the cable reel by a release in the tension of the spring; and
  - an electrical generator arranged for rotating or turning in response to a rotational movement of the drum housing, thereby producing electrical power.

In a first possible implementation form of the system of the second aspect, the torsion spring is operatively connected to the drum housing for shifting between the first mode of operation and a second mode of operation, wherein for the second mode of operation the spring is operatively connected to the drum housing for building up a tension in the spring by rotation of the drum housing in a direction for winding up the cable on the cable reel.

It should be understood that the system according to the second aspect also covers a number of possible embodiments, which are equal to the possible embodiments of the system of the first aspect, which are not covered by the above described systems of the second aspect.

The second aspect also provides a method for generating electrical power from surface waves by use of an energy conversion system according to the second aspect and including the first possible implementation form of the system of the second aspect, said method comprising:
- positioning the float in the sea by attaching the second end part of the cable to a submerged structure or to the sea bed;
- arranging the torsion spring to be operatively connected to the drum housing in the second mode of operation;
- winding up the cable on the cable reel to build up a pre-tension in the cable and the torsion spring;
- arranging the torsion spring to be operatively connected to the drum housing in the first mode of operation;
- allowing the drum housing to rotate in the direction of unwinding the cable from the cable reel in response to the float being moved away from the submerged structure by waves, said unwinding rotation of the drum housing increasing the tension of the spring and activating rotation of the electrical generator;
- allowing the drum housing to rotate in the opposite direction in response to the cable being wound up on the cable reel by a release in the tension of the spring when the float is moved closer to the submerged structure by ocean waves, said winding rotation of the drum housing activating rotation of the electrical generator; and
- extracting electrical power from the electrical generator.

In an embodiment of the method of the second aspect the extracted electrical power is stored in a battery.

In an embodiment of the method of the second aspect, the step of winding up the cable on the cable reel to build up a pre-tension in the cable and the torsion spring is performed until a predetermined cable tension is reached, where the predetermined cable tension may correspond to the tension of the cable when the float is substantially half submerged into the sea.

In an embodiment of the method of the second aspect, the method further comprises monitoring the tension of the cable during the movement of several waves, comparing the obtained tension values with the predetermined tension, and when the difference between the mean value of the monitored tension and the predetermined pre-tension exceeds a predetermined value, a winding and/or unwinding of the cable on the cable reel is performed for changing the pre-tension in the cable.

In an embodiment of the method of the second aspect, the method further comprises determining a rotation angle of the drum housing when the drum housing is turned or rotated around the shaft attachment from a first position to a second position,
- wherein the first position is reached when the drum housing stops rotating by unwinding of the cable from the cable reel in response to the float being moved away from the submerged structure by the upward movement of a wave, and wherein the second position is reached when the drum housing stops rotating in the opposite direction by winding up the cable on the cable reel in response to the float being moved closer to the submerged structure by the following downward movement of the wave.

In an embodiment of the method of the second aspect, a further winding up of the cable on the cable reel is performed for submerging the float into the sea, when one or more determined rotation angles equals or exceeds a predetermined rotation angle.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which:

FIG. 2 is a top view of the wave energy system of FIG. 1a;

DETAILED DESCRIPTION

Figure 1A:
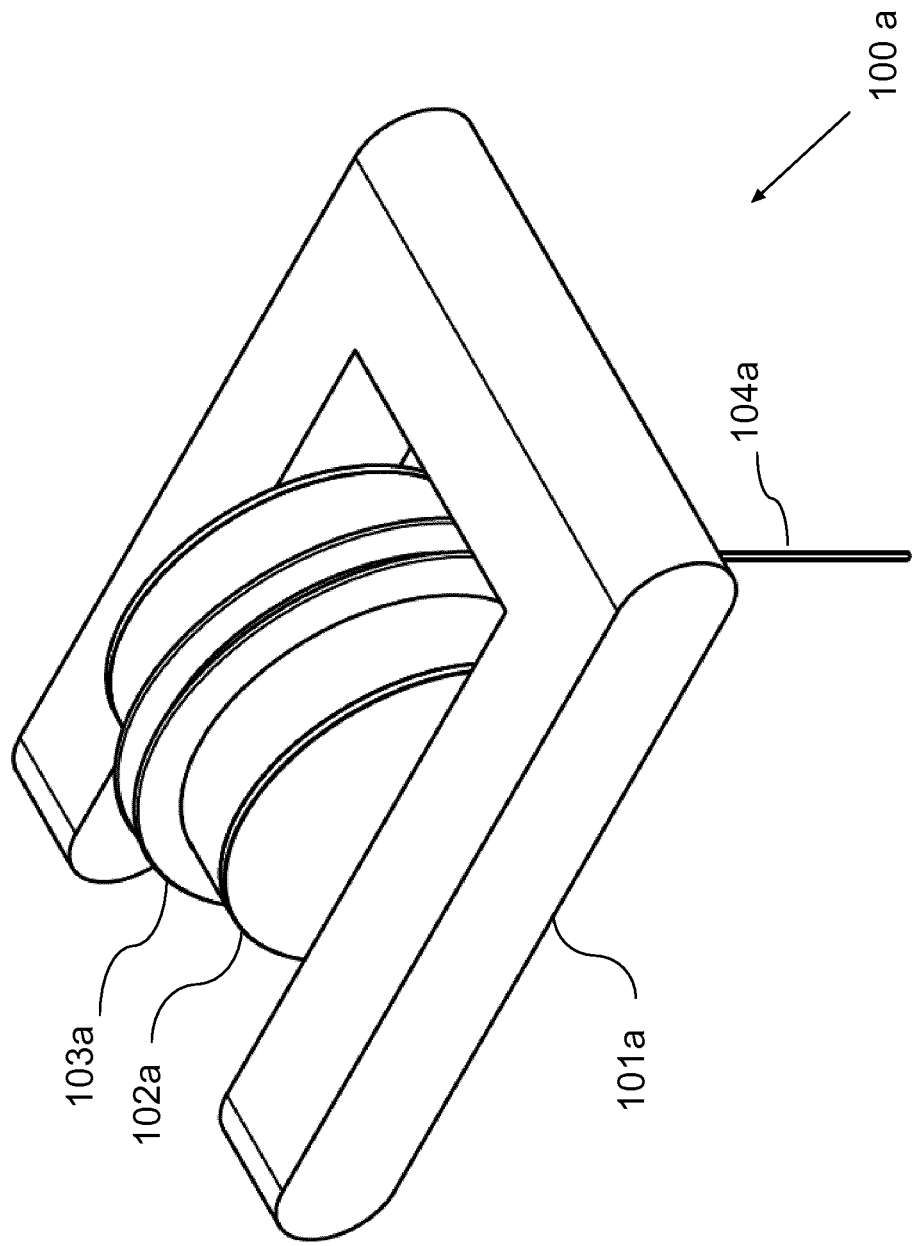
FIGS. 1a and 1b are perspective views of two different sized wave energy systems according to example embodiments.
Figure 1B:
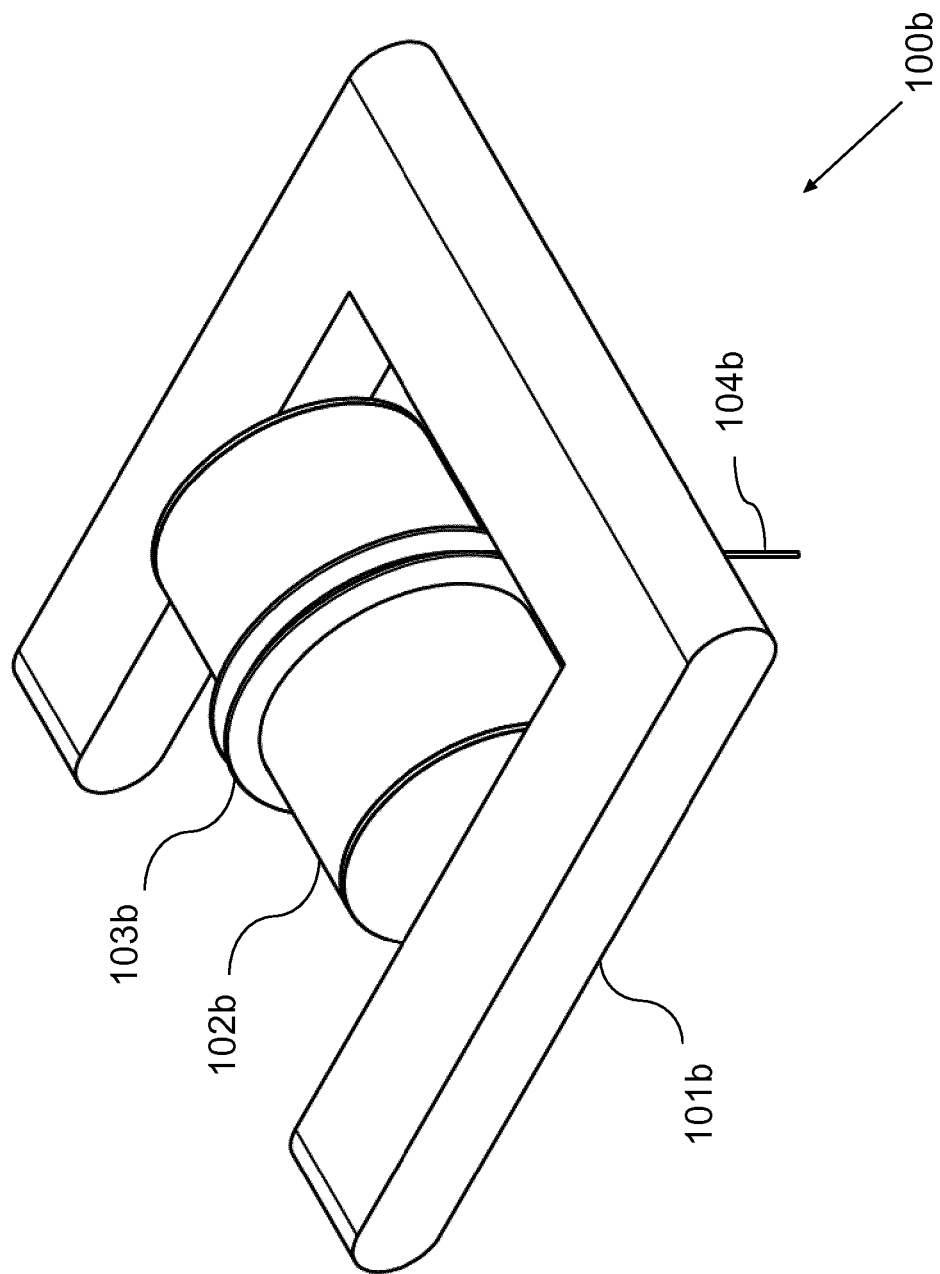
Figure 2:
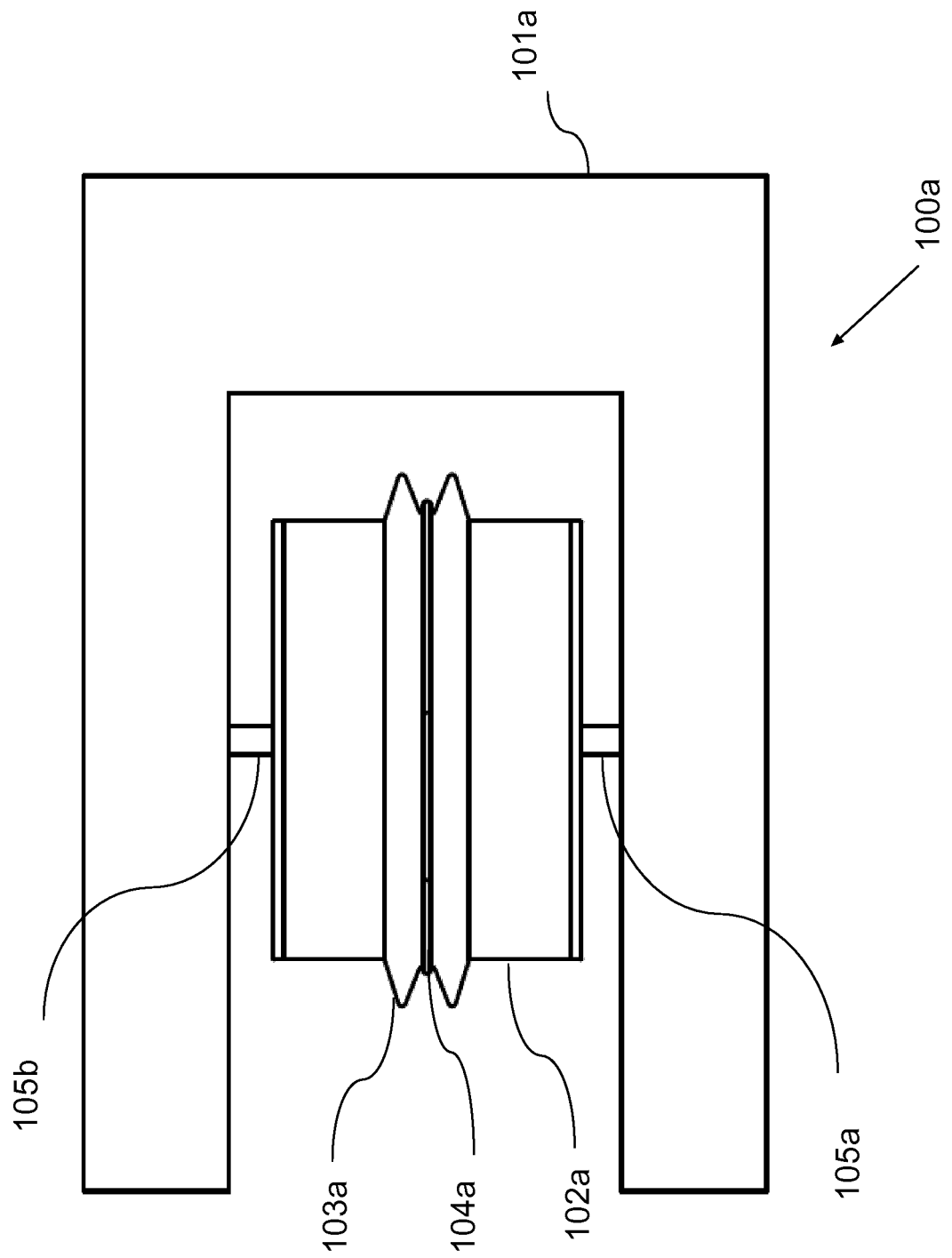

FIGS. 1a and 1b are perspective views of two different sized wave energy systems 100a and 100b, and FIG. 2 is a top view of the wave energy system 100a of FIG. 1a. The systems 100a and 100b each has a float 101a, 101b and a power generation drum with a drum housing 102a, 102b. The drum housing 102a, 102a is rotationally attached to the float 101a, 101b by a shaft attachment 105a, 105b, and the shaft attachment 105a, 105b allows an at least partially rotational movement of the drum housing 102a, 102b and the float 101a, 101b relative to each other. The drum housing 102a, 102b holds a cable reel 103a, 103b with a cable 104a, 104b having a first end part connected to the cable reel 103a, 103b and a second end part. The cable reel 103a, 103 b is an integral part of or connected to the drum housing 102a, 102b and rotates with the drum housing 102a, 102b.

It is preferred that the float 101 is a buoy, which is substantially "U" shaped with an opening being defined by two oppositely arranged arms and a front part connecting the two arms. The shaft attachment 105a, 105b is fixedly connected to the two arms of the float 101 with the drum housing 102 rotationally arranged between the two arms. The front part has an outer surface facing away from the drum housing 102. It is preferred that the outer surface of the front part has a curved shape, and also that the back surface of each of the two arms has a curved shape.

The combined drum and float 101 has a centre of gravity, and the shaft attachment 105a, 105b is fixed to the float 101 behind the centre of gravity. Thus, the centre of the drum and drum housing 102 is located at a distance to the outer surface of the front part, which distance is larger than the distance from the gravity centre to the outer surface of the front part. It is preferred that the distance from the centre of the drum to the centre of gravity is at least 5% of the total length of the float 101 when measured in the direction of the arms. It is also preferred that the cable reel 103 has a radius, which is larger than the distance between the centre of the drum and the centre of gravity.

The drum housing 102a, 102b is rotationally connected to the shaft attachment 105a, 105b by a watertight connection, such as a watertight rotating seal, in order to provide a dry atmosphere within the drum housing 102a, 102b for protecting mechanical and electrical components, which are arranged within the drum housing 102a, 102b.

Figure 3:
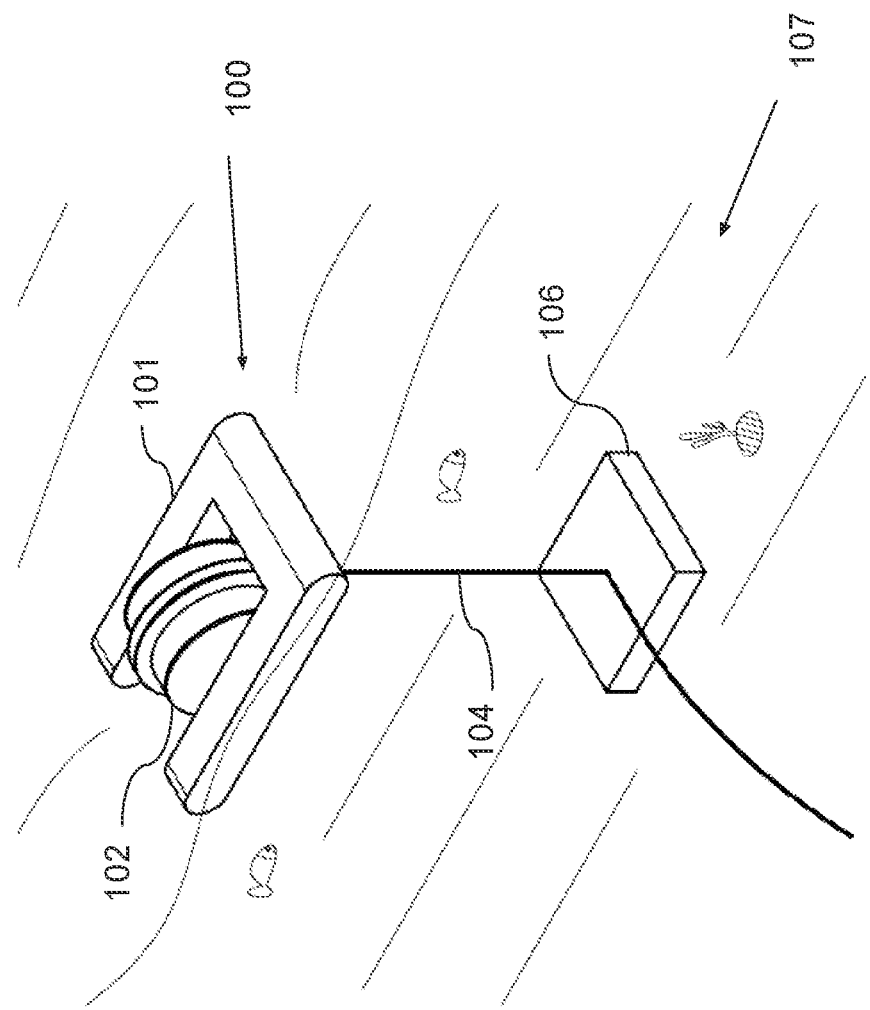
FIG. 3 shows the wave energy system of FIG. 1a positioned in the sea according to an example embodiment.

FIG. 3 shows a wave energy system 100 corresponding to the system 100a of FIG. 1a positioned in the sea according to an example embodiment. The cable 104 has a second end part, which is connected to an anchor block 106 placed on the sea bed 107. The second end part of the cable 4 may extend further than to the anchor block 106, as the cable may be configured to deliver the generated power to a battery system, which will be discussed in connection with FIG. 8. It is preferred that when the float 101 is arranged in the sea with no wave actions, the cable 4 is wound on the cable reel 103 until a predetermined pre-tension is reached for the cable 104. Ideal pre-tension for maximum power output maybe reached when the float 101 is forced half of its total free available buoyancy under water +/−20%, depending on the wave height. Thus, the pre-tension may be determined so that the float 101 is substantially half submerged into the sea, +/−20%, by the tension in the cable 104.

By having the cable 104, which is used to position the float 101 to the sea bed 107, attached to the float 101 by a cable reel 103, which is secured to the drum housing 102, the length of the cable 104 can easily be adjusted by rotation of the drum housing 102 to wind or unwind the cable 104 on the cable reel 103. Thus, the length of the cable 104 may be adjusted to follow a change in the sea level, whereby the float 101 can be positioned in the sea for maximum energy conversion.

Figure 7:
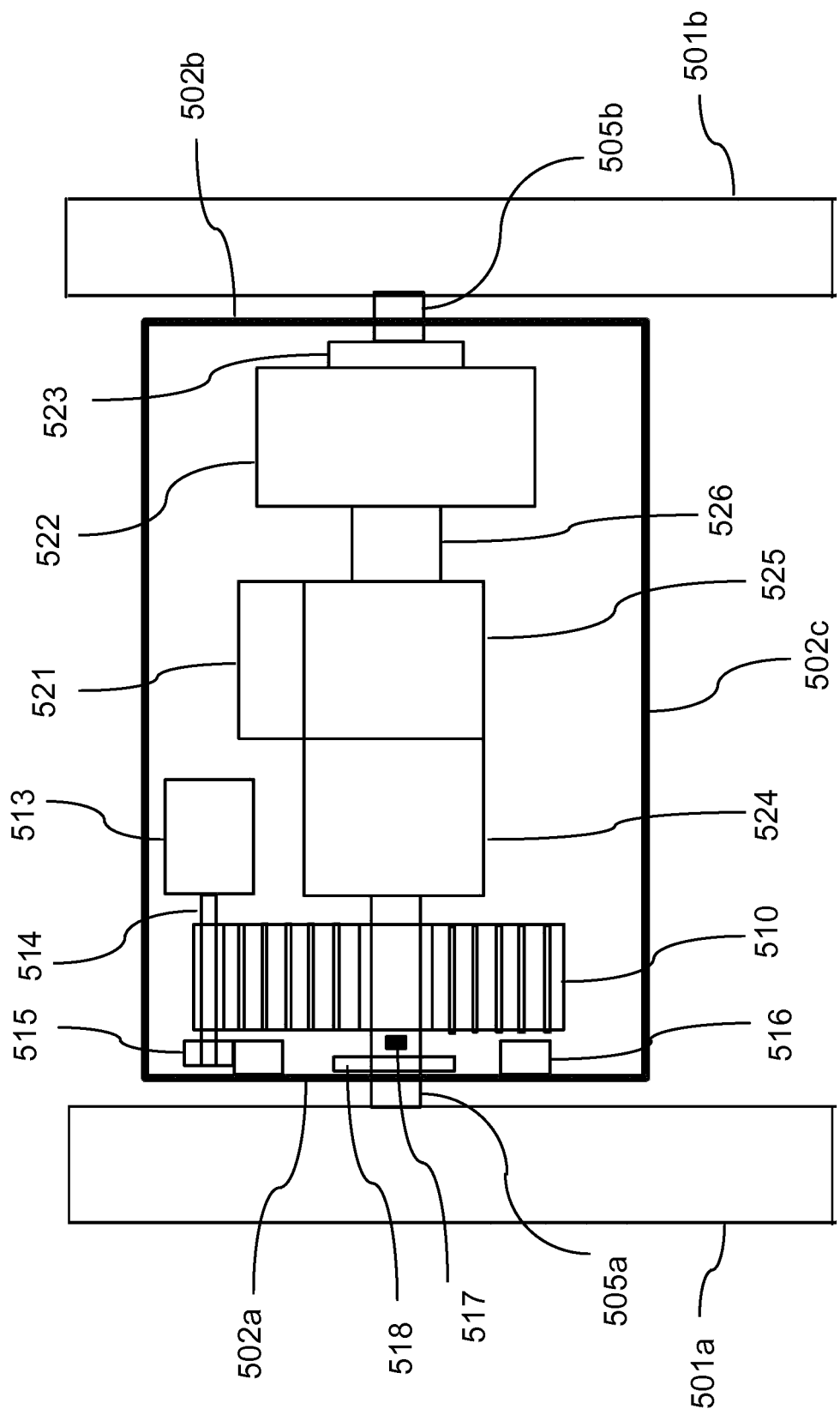
FIG. 7 is a schematic drawing illustrating further details within the drum of an energy system according to an exemplary embodiment.

In order to generate electrical power, the drum housing 102 comprises an electrical generator 522, see FIG. 7, which is arranged for rotating or turning in response to a rotational movement of the drum housing, thereby producing electrical power. The rotational movement of the drum housing 102 is obtained when the float 101 is positioned in the sea with rising and falling waves. The drum housing also comprises a torsion spring 510, see FIG. 5, which can be operatively connected to the drum housing 102 in a first mode of operation, where a tension is built up in the spring 510 by rotation of the drum housing 102 in a direction for unwinding the cable 104 from the cable reel 103. Such unwinding of the cable 104 is obtained when the float 101 is lifted and/or moved horizontally by a rising wave. When the wave reaches the fall of the wave, the float 101 is moved downwards with the wave, and the torsion spring 510 will act to release the tension obtained during the rise of the wave, whereby the drum housing 102 is rotated by the torsion spring 510 in the opposite direction for winding up the cable 104 on the cable reel 103. This rotation of the drum housing 102 activates the electrical generator 522.

Figure 4:
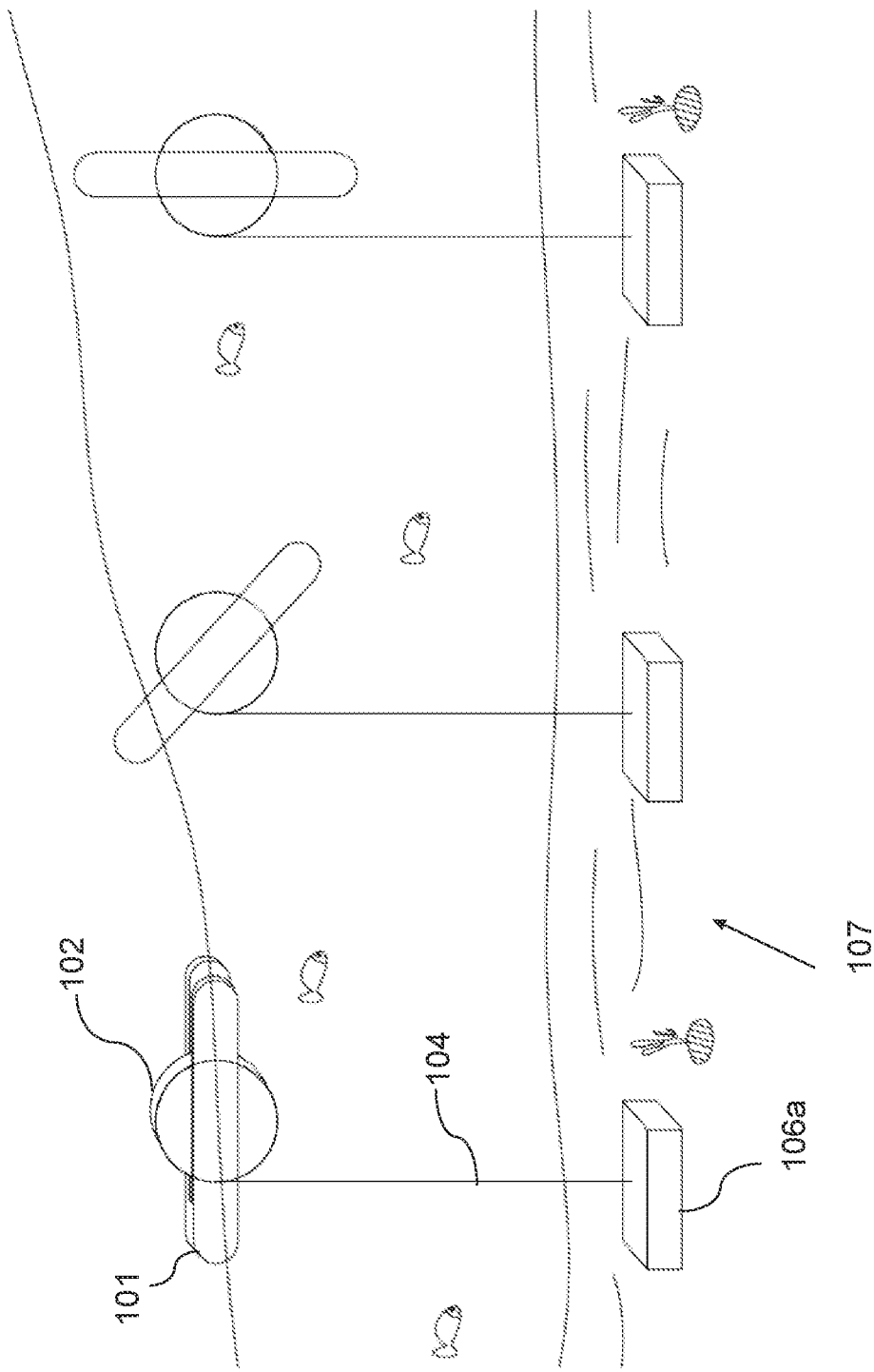
FIGS. 4a, 4b and 4c illustrate the action of waves on the wave energy system of FIG. 3 according to an example embodiment.

The movement of the float 101 and drum housing 102 with rising and falling waves is illustrated FIGS. 4a, 4b and 4c. In FIG. 4a the float 101 is in a position with no wave actions, and the float 101 is in a substantially horizontal position, and the tension of the cable 104 is substantially equal to the pre-tension. In FIG. 4b, a rising wave moves the float 101 upwards, with the float 101 turned to a more vertical position. The upwards movement of the float 101 result in an unwinding of the cable 104 from the cable reel 103, whereby the drum housing 102 is rotated together with the cable reel 103 and a tension is built up in the torsion spring 510. The turning of the float 101 may further act to build up the tension in the spring 510. When the wave falls again, the float 101 will move downwards and return to the position of FIG. 4a. During the downwards movement and turn of the float 101 from FIG. 4b to FIG. 4a, the tension being built up in the torsion spring 510 releases and rotates the drum housing 102, whereby the cable 104 is wound up on the cable reel, thereby maintaining a pre-tension in the cable 104. During normal wave action, the float 101 will be moved between the positions illustrated in FIGS. 4a and 4b, but when the waves get too big, the unwinding of the cable 104 cannot follow the rise of the wave, and the float 101 will be turned by the rising wave to a substantially vertical position, which is illustrated in FIG. 4c. Thus, for the situation shown in FIG. 4c the waves have got so big that it is time to pull the float or buoy 101 under water in a storm protection mode.

Figure 5:
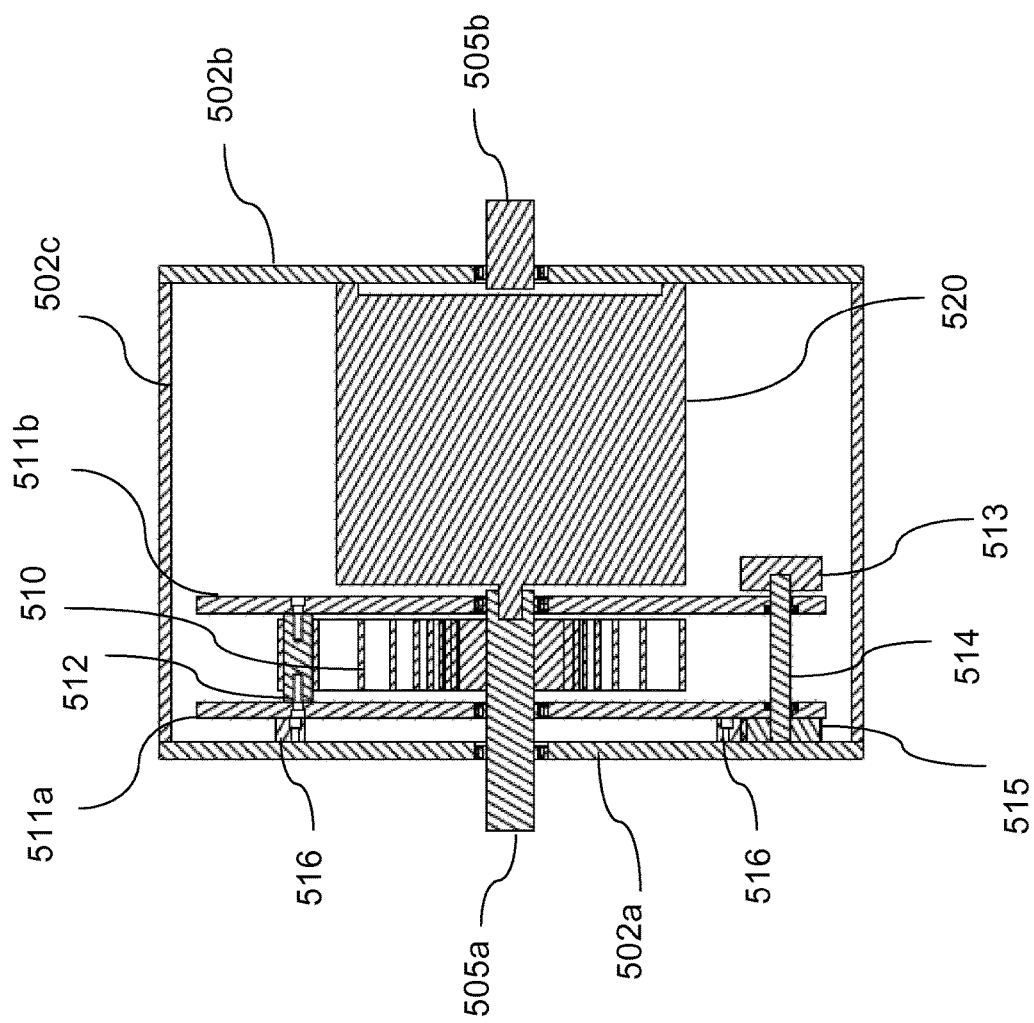
FIG. 5 is a schematic drawing showing the arrangement of a spring system and a gear system within the drum of an energy system according to an example embodiment.
Figure 6:
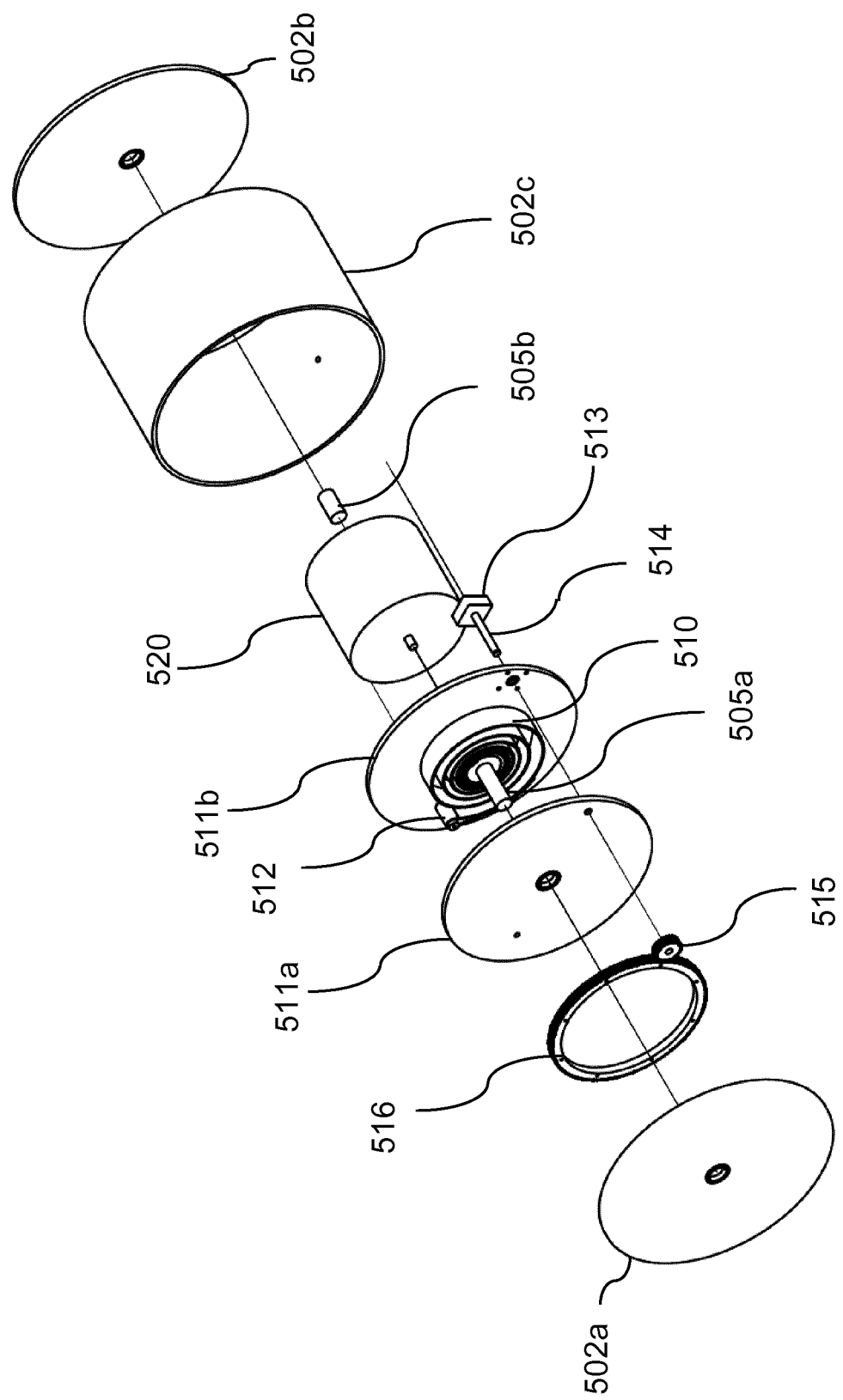
FIG. 6 is an exploded view showing details of the spring and gear systems of FIG. 5 according to an example embodiment.

The arrangement and operation of the torsion spring 510 within the drum housing 102 will be explained in the following in connection with FIGS. 5 and 6, where FIG. 5 is a schematic drawing showing the arrangement of a spring system and a gear system within the drum of an energy system 100 according to an example embodiment, while FIG. 6 is an exploded view showing details of the spring and gear systems of FIG. 5.

In FIGS. 5 and 6, the drum housing 102 has a left side lid 502a, a right side lid 502b, and a cylindrical drum part 502c. The drum housing 102, 502a,b,c is rotationally arranged on the shaft attachment 105a, 505a, 105b, 505b which has two shaft parts, a left shaft part 105a, 505a and a right shaft part 105b, 505b, which shaft parts 105a, 505a and 105b, 505b both have one end fixedly connected to the float 101 and the other end arranged within the drum housing 102, 502a,b,c with the axis of each shaft part 505a, 505b following the centre axis of the drum housing 102, 502a,b,c. The other end of the left shaft part 505a is supported on the inner side of the left side lid 502a with a double set of ball bearings, and the other end of the right shaft part 505b is supported on the inner side of the right side lid 502b with a double set of ball bearings. By having the shaft parts 505a, 505b rotationally connected to the drum side lids 502a, 502b by use of a double set of ball bearings, the ball bearing connection will support radial loads and bending loads on the two shaft parts 505a, 505b during operation in the sea.

The drum housing 502a,b,c comprises a spring system and a gear system, where the spring system holds a torsion spring 510, which may be a clock spring, with a first end non-rotationally connected to the left shaft part 505a. The gear system comprises a disc system with two oppositely arranged discs 511a and 511b, which are rotationally arranged relative to the left shaft 505a and the drum housing 502a,b,c, and the torsion or clock spring 510 is arranged between the two discs 511a, 511b with a second end of the spring 510 secured to the two discs 511a, 511b by a spring support 512. The gear system further holds an electrical motor 513, which is secured to an outer peripheral part of the inner disc 511b, which motor 513 has a rotation axle 514 extending through the inner and outer discs 511b and 511a. An outer part of the rotation axle 514, which extends on the side of the disc 511a facing the left drum lid 502a, holds a first, small gear wheel 515 engaging a second and larger gear wheel 516, which is fixedly connected to the drum housing. By having this arrangement of the spring 510 within the drum housing 502a,b,c, a rotation of the motor axle 514 and the first gear wheel 515 may rotate the drum housing 502a,b,c and the discs 511a, 511b holding the second end of the spring 510 in opposite directions relative to each other.

When the motor 513 operates to rotate the first gear wheel 515, thereby rotating the drum housing 502a,b,c relative to the discs 511a, 511b and the second end of the spring 510, the torsion spring 510 is operatively connected to the left lid of the drum housing 502a in a second, rotational mode of operation via the gear system. When the motor rotation axle 514 is held in a fixed, non-rotation position, the second end of the spring 510 is operatively connected to the left lid of the drum housing 502a in a first, non-rotational mode of operation via the gear system.

When the spring and gear system is in the first, non-rotational mode of operation with the second end of the torsion spring 510 held in a fixed position relative to the drum housing 502a, the second end of the torsion spring follows a rotation of the drum housing 502a,b,c, whereby a rotation of the drum housing 102, 502a,b,c in a direction of unwinding the cable 104 from the cable reel 103 builds up a tension in the spring 510 and a torque to the left shaft part 505a. Having built up a tension in the spring 510 in the first mode of operation, then the spring 510 may act to rotate the drum housing 102, 502a,b,c in a direction of winding up the cable 104 on the cable reel 103 by a release in the tension of the spring 510.

When the spring and gear system is in the second, rotational mode of operation, the gear system is configured for rotating the motor axle 514 and the first gear 515 in a direction of rotation, whereby the second gear 516 and the drum housing 102, 502a,b,c rotates in a first direction relative to the shaft attachment 105a,b, 505a,b for winding up the cable 104 on the cable reel 103. As long as the cable 104 is slack, the cable 104 is wound up, and the discs 511a, 511b and the second end of the spring 510 is held in a position with only a small relative tension being built up in the spring 510. When the cable 104 is no longer slack, a force is exerted on the cable reel 103 and drum housing 102, 502a,b,c from a tension being built up in the cable 104 when the cable 104 is further wound up on the reel 103, and the disc system 511a, 511b and the second end of the spring 510 will now rotate in a second direction opposite to the first direction of the drum housing 502a,b,c relative to the shaft attachment 105a,b 505a,b. This rotation of the second end of the torsion spring 510 builds up a tension in the spring 510 and a torque to the left shaft part 505a. It is noted that for the first and second modes of operation, the drum housing 102, 502a,b,c is rotated in opposite directions when building up a tension in the spring 510.

When positioning the float 101 in the sea, a tension or pre-tension should be built up in the cable 104 while at the same time a tension should be built up in the spring 510. For this purpose, the torsion spring 510 is operatively connected to the drum housing 102, 502a,b,c for operating in the second or rotational mode of operation. When the float 101 has been positioned in the sea, the float 101 is moved up and down by the waves, which movement may be used to generate electric power. For this purpose, the torsion spring 510 is operatively connected to the drum housing 102, 502a,b,c for operating in the first or non-rotational mode of operation, in which the gear system is configured for holding the second end of the spring 510 in a fixed position relative to the drum housing 102, 502a,b,c.

In the first mode of operation, then when a wave lifts the float 101, the cable 104 is unwound from the cable reel 103, and with the second end of the spring 51001 being hold fixed to the drum housing 102, 502a,b,c, the second end of the spring 510 turns with the cable reel 103 while building a further tension in the spring 501. When the wave goes down again, the tension of the spring 510 winds up the cable on the cable reel.

In the second mode of operation, the gear system rotates the drum housing with the cable reel and the second end of the spring 510 in opposite directions, whereby when the gear system rotates the drum housing 102, 502a,b,c to wind up the cable 104, the second end of the spring 510 is rotated or turned with a tension being built up in the spring 510.

FIGS. 5 and 6 further show a block 520, which is rotationally connected to the right shaft part 505b. This block 520 holds the electrical generator 522 and a gear drive system interconnecting the drum housing 502a,b,c and the generator 522, see the following discussion in connection with FIG. 7, which shows further details of the power generation drum according to an exemplary embodiment.

In FIG. 7, the left shaft part 505a is fixedly connected to a left r 501a of the float 101, and the right shaft part 505b is fixedly connected to a right arm 501b of the float 101, whereby the housing 102, 502a,b,c is rotationally attached to the float 101, 501a,b. The drum housing 502a,b,c shown in FIG. 7 also comprises a sensor system 517 configured for sensing a torque on the left shaft part 505a. The sensor system 517 may comprise a number of strain gauges attached to the left shaft part 505a within the drum housing, whereby a torque on the shaft part 505a can be measured by known techniques. In an example embodiment four strain gauges can be attached to the shaft part 505a and oriented in a +/−45° pattern relative to the centre line of the shaft part 505a. In an embodiment an angle detecting system 518 is also connected to shaft part 505a within the drum housing 502a,b,c, where the angle detecting system may be configured for determining a rotation angle of the drum housing 102, 502a,b,c when the drum housing 102, 502a,b,c is turned or rotated around the shaft 105a,b, 505a,b from a first position to a second position. In an embodiment the angle detection system comprises an optical angular encoder.

In FIG. 7 is also shown a housing with the electrical generator 522, which is arranged within the drum housing 102, 502a,b,c for rotating or turning in response to a rotational movement of the drum housing 102, 502a,b,c. The generator housing also comprises a flywheel (not shown in FIG. 7), which is operatively connected to the electrical generator 522 in order to store the rotational energy. A double set of ball bearings 523 is provided for allowing rotation of the generator and flywheel about the shaft part 505b. The electrical generator 522 may be arranged for rotating or turning in one direction only. In order to obtain the rotation of the generator 522 by rotation of the drum housing 102, 502a,b,c, a generator gear drive is provided for interconnecting the drum housing 102, 502a,b,c and the electrical generator 522. The generator gear drive comprises a speed-up gear 524, which may speed up the relatively slow rotation of the drum housing 102, 502a,b,c by a factor of 10 or 20. The gear drive comprises a unidirectional gear 525 and a one-way clutch 526, which allows the generator 522 to rotate in one direction only, while the drum housing 102, 502a,b,c changes direction of rotation.

In an embodiment the electrical generator 522 with the flywheel, the speed-up gear 524, the unidirectional gear 525, and the one-way clutch 526 are all centred for rotational movement about an axis defined by the shaft parts 505a,b. The speed-up gear 524 operatively connects the drum housing 502a and the unidirectional gear 525, and the one-way clutch 526 operatively connects the unidirectional gear 5254 and the electrical generator 522, and the electrical generator 522 operatively connects to the flywheel.

The drum housing 102, 502a,b,c also comprises a control system 521, which may be configured for controlling rotation of the drum housing 102, 502a,b,c and winding of the cable 104 on the cable reel 103 based on the torque of the shaft part 505a sensed by the sensor system 517. Here, the control system 521 may be configured for determining a cable tension based on the sensed torque and for controlling rotation of the drum housing 102, 502a,b,c and winding of the cable reel 103 until a predetermined tension or pre-tension is determined for the cable 104. The control system 521 may be arranged on the generator gear drive system, and in FIG. 7, the control system 521 is attached to the unidirectional gear 525.

In order to control the rotation of the drum housing 102, 502a,b,c, for winding the cable 104, the control system is configured for controlling the operational mode of the combined spring and gear system to be in the first or second mode of operation by controlling rotation of the motor axle 514.

The angle detection system 518 may be configured for determining the angular difference between a first and a second position of the drum housing 102, 502a,b,c relative to the shaft parts 105a,b, 505a,b. Here, the first position may be reached when the drum housing 102, 502a,b,c stops rotating by unwinding of the cable 104 from the cable reel 103 in response to the float 101 being moved away from the submerged structure 106a by the upward movement of a wave, and the second position may be reached when the drum housing 102, 502a,b,c stops rotating in the opposite direction by winding up the cable 104 on the cable reel 103 in response to the float 101 being moved closer to the submerged structure 106a by the following downward movement of the wave.

The control system 521 may also be configured for controlling rotation of the drum housing 102, 502a,b,c for winding up the cable 104 on the cable reel 103 to submerge the float 101 into the sea, when one or more determined angular differences between the first and second position equals or exceeds a predetermined maximum angular difference.

The control system may also be configured for determining the tension of the cable 104 during the movement of several waves, comparing the obtained tension values with the predetermined pre-tension, and controlling rotation of the drum housing 102, 502a,b,c for winding and/or unwinding the cable 104 on the cable reel 103 to change the pre-tension in the cable 104 based on the comparison.

A number of slip rings (not shown in FIG. 7) are also provided and operatively connected to the shaft parts 505a, b, in order to allow the transmission of power and electrical signals between the stationary shaft parts 505a,b and the rotating devices within the rotating drum housing 102, 502a,b,c, which rotating devices includes the motor 513, the control system 521 and the electrical generator 522. A slip ring may be provided at the inside of both the left and right housing lids 502a and 502b.

Figure 8:
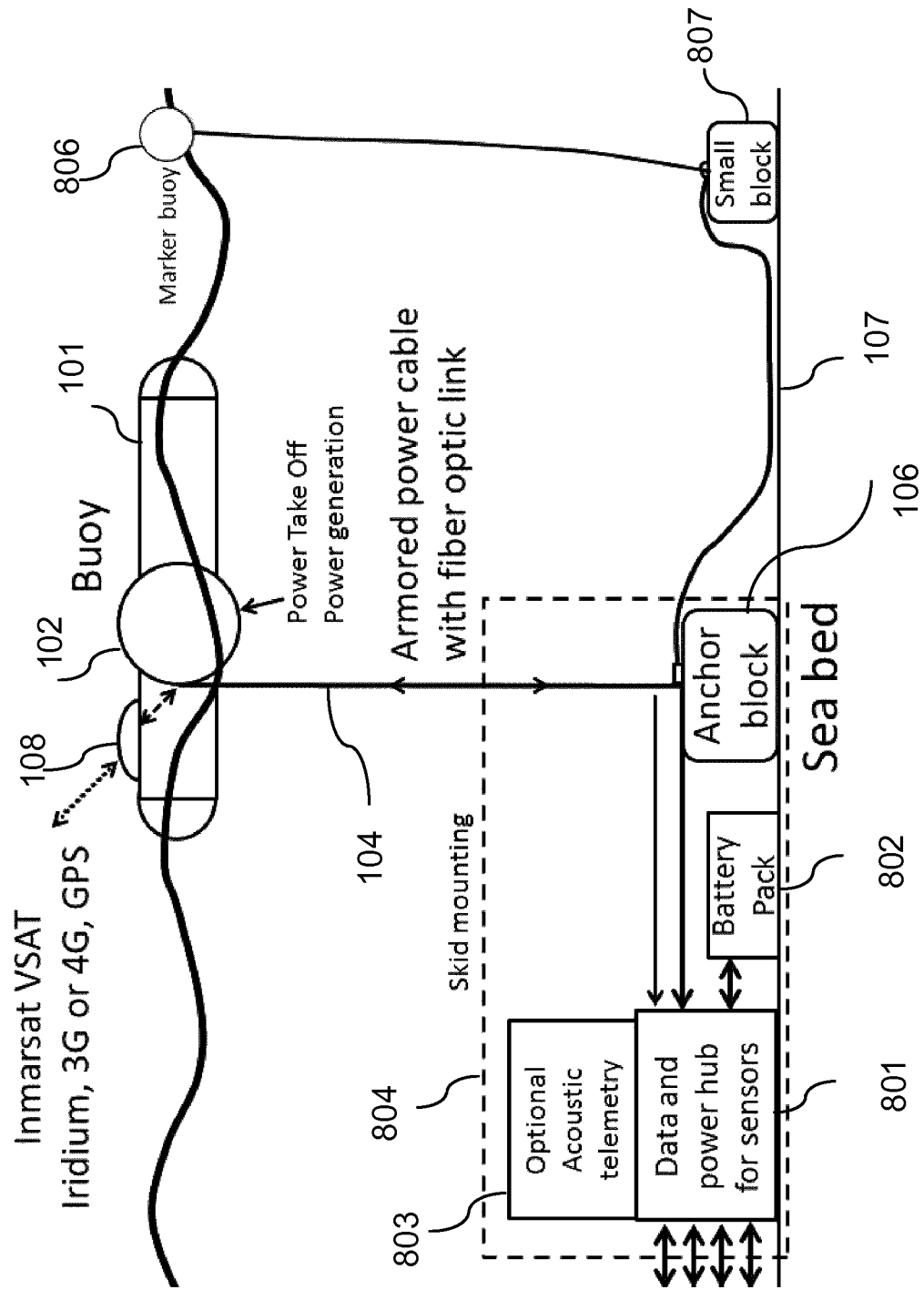
FIG. 8 is a block diagram illustrating a wave energy system positioned in the sea, with a battery for storing electrical power, cables for transferring power from the drum to the battery, cables for extracting power from the battery to a user platform, and optical fibre connections for external communication to the control system within the drum according to an example embodiment.
Figure 9:
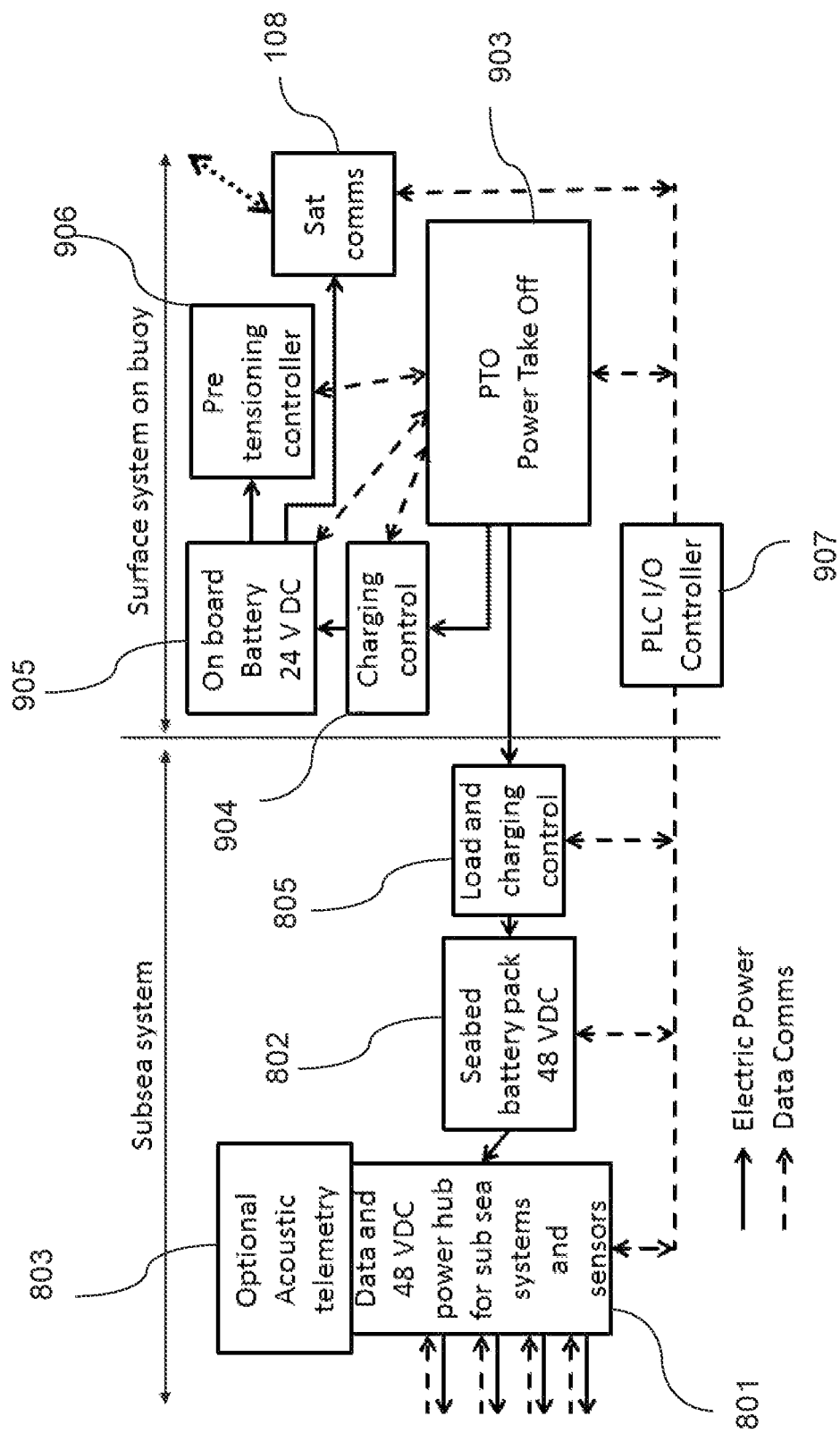
FIG. 9 is a block diagram illustrating electrical power and data control components of the wave energy system of FIG. 8 according to an example embodiment.

FIG. 8 is a block diagram illustrating a wave energy system positioned in the sea according to an example embodiment, and FIG. 9 is a block diagram illustrating electrical power and data control components of the wave energy system of FIG. 8. The wave energy system of FIG. 8 holds the components of the energy system 100 of FIG. 1 and comprises a buoy or float 101, a power generation drum with a cable 104 wound on a cable reel 103 (not shown in FIG. 8). For the system of FIG. 8, the buoy 101 holds a satellite communication unit 108, whereby data can be communicated to and from the control system 521 via satellite communication, such as Inmarsat VSAT and Iridium system. The communication unit 108 may also or alternatively be configured for mobile phone communication, such as 3G, 4G or GPS communication.

The buoy 101 is positioned in the sea by the cable 104 having a second end part connected to the anchor block 106 on the sea bed 107. In an embodiment a marker buoy 806 is positioned close to the wave energy buoy 101, where the marker buoy 806 is secured to a small anchor block 807 on the sea bed 107 by a cable. The small anchor block 807 may be secured to the main anchor block 106 by a cable.

The cable 104 is an armoured power cable, which also holds optical fibres, and the second end part of the cable 104 is further connected to a subsea system, which may be enclosed in a skid mounting 804, and which holds a data and power hub unit for sensors 801 and a battery pack 802, and which also holds a load and charging control unit 805, see FIG. 9. In an embodiment an electrical and fibre optical slip ring rotary joint (not shown in FIG. 8) may be arranged as part of the power cable 104 between the float or buoy 101 and the submerged structure of anchor block 106, connecting an upper part of the cable 104 with a lower part of the cable 104. The use of a slip ring rotary joint will allow the buoy 101 to turn in the water without twisting the part of the cable 104, which is connected to the anchor block 106.

The subsea system may optionally hold an acoustic telemetry unit 803 configured for transmitting and receiving data by acoustic telemetry. The components of the subsea system is also shown in FIG. 9, which further shows electrical power and data control components of a surface system arranged within the drum housing 102 and the buoy 101. Besides the satellite communication unit 108 arranged at the buoy 101, the surface system comprises a power take off unit 903, a PLC I/O controller 907, a charging control unit 904, an on board battery 905, and a pre-tensioning controller 906 being part of the control system 521.

In the preferred embodiment, the generated electrical power is supplied from the electrical generator 522 through the power take off unit 903 and slip rings, down the power cable 104 to the load and charging control unit 805, from where it charges the battery pack 802.

The power take off unit 903 also charges the on board battery 905 via the charging control 904, and the on board battery 905 supplies power to the control system 521 with the pre-tensioning controller 906 and the satellite communication unit 108. Data is communicated between the surface system and the subsea system by optical fibre communication through optical fibres within the armoured power cable 104. The data communication is controlled by the PLC I/O controller 907 within the surface system, where the controller 907 communicates data with the satellite communication unit 108 and with the power take off unit 903, which again communicates with the charging control unit 904, the on board battery 905 and the control system 521 with the pre-tensioning controller 906. Via the fibre optic link of the cable 104, the controller 907 communicates data with the data and power hub unit 801, the load and charging control unit 805 and the battery pack 802. The data and power hub unit 801 holds power and communication lines for control of delivery of electrical power to a user and for data communication with the user.

Figure 10:
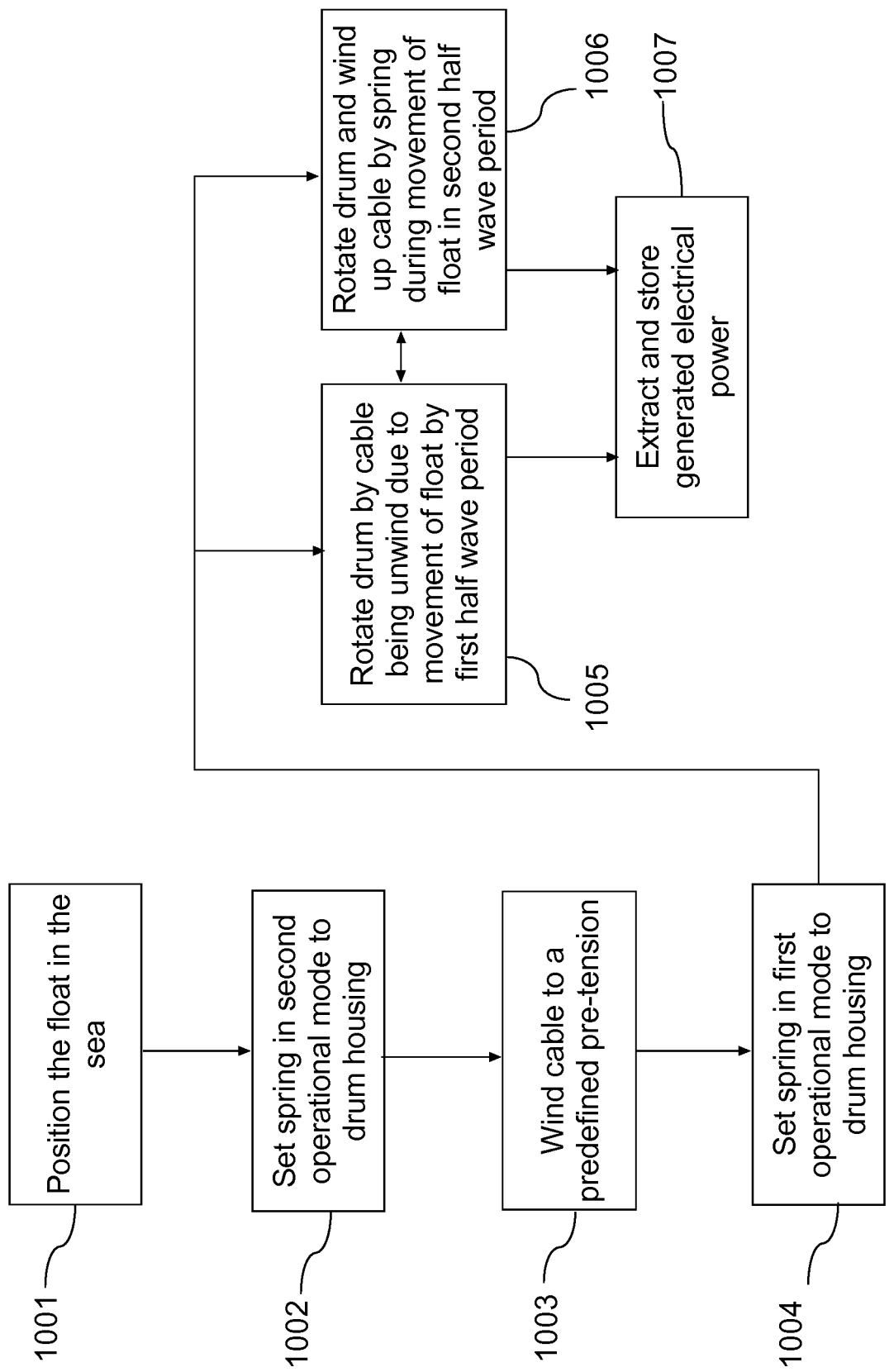
FIG. 10 is a flow chart illustrating a method of generating electrical power according to an example embodiment.

FIG. 10 is a flow chart illustrating a method of generating electrical power according to an example embodiment. In a first step 1001, the float 101 is to be positioned in the sea. This requires that the torsion spring 510 is operatively connected to the drum housing 102 to be in the second operational mode, step 1002. In the second operational mode, the motor 513 and the gears 515, 516 are controlled to rotate, whereby the cable 104 is wound on the cable reel 103, until the desired pre-tension is determined by the control system 521 from the measured torque on the shaft attachment 505, step 1003. From here, the torsion spring 510 is operatively connected to the drum housing 102 to be in the first mode of operation, with the motor 513 and gears 515, 516 being controlled for non-rotation, step 1004.

When in the first operational mode, the float 101 and the drum housing 102 with the torsion spring 510 is in the normal energy generation mode of operation, where in step 1005, the drum housing 102 is allowed to rotate in the direction of unwinding the cable 104 from the cable reel 103 in response to the float 101 being moved away from the submerged structure 106a by waves, with the unwinding rotation of the drum housing 102 increasing the tension of the spring 510 and activating rotation of the electrical generator 522. In step 1006, the drum housing 102 is allowed to rotate in the opposite direction in response to the cable 104 being wound up on the cable reel 103 by a release in the tension of the spring 510 when the float 101 is moved closer to the submerged structure 106a by ocean waves, where the winding rotation of the drum housing 102 activates rotation of the electrical generator 522. The electrical power generated by activation of the electrical generator 522, is extracted and may be stored in the battery pack 802, step 1007.

Figure 11:
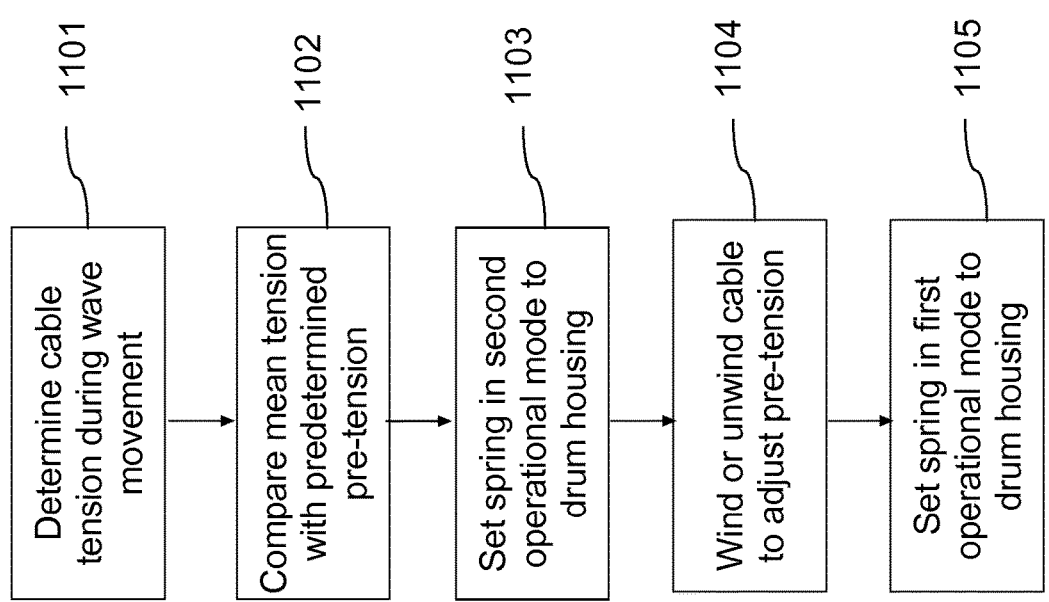
FIG. 11 is a flow chart illustrating a method of adjusting a pre-tension of a wave energy system to an example embodiment.

FIG. 11 is a flow chart illustrating a method of adjusting a pre-tension of a wave energy system to an example embodiment. In a first step 1101, the tension of the cable 104 is monitored and determined during the movement of several waves. Then, in step 1102, the obtained tension values are compared with the predetermined pre-tension, and when the difference between the mean value of the monitored tension and the predetermined pre-tension exceeds a predetermined value, the torsion spring 510 is operatively connected to the drum housing 102 in the second mode of operation, step 1103, a winding and/or unwinding of the cable 104 on the cable reel 103 is performed for adjusting the pre-tension in the cable 104, step 1104, and the torsion spring 510 is brought back to be operatively connected to the drum housing 102 in the first mode of operation, step 1105. In step 1104, the pre-tension may be adjusted to reach the mean value of the monitored tension of the cable 104.

Thus, by monitoring the variation and the mean value of the cable tension during many successive wave periods, changes in tidal level can be corrected for and the mean pre-tension of the cable 104 can be optimized for maximum energy production in a given wave climate.

Figure 12:
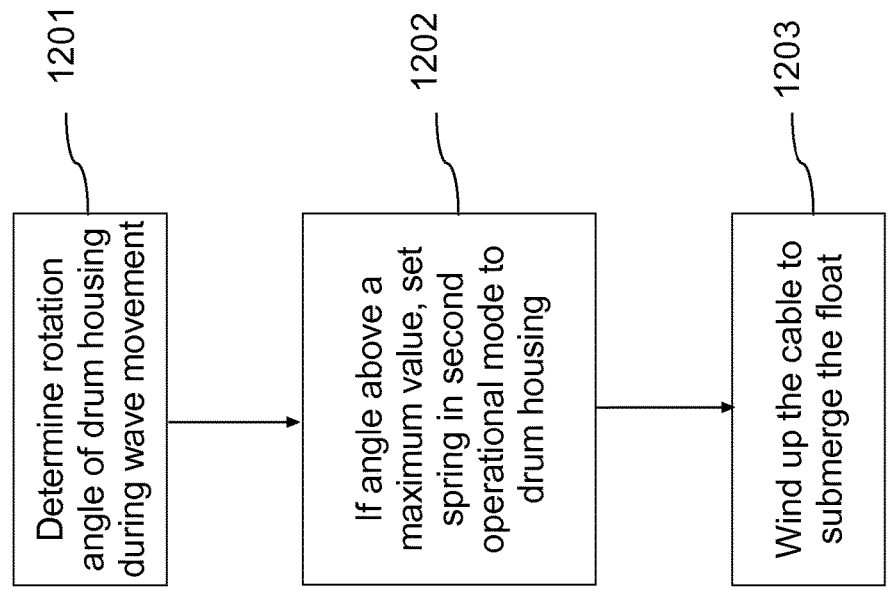
FIG. 12 is a flow chart illustrating a method of submerging a wave energy system according to an example embodiment.

FIG. 12 is a flow chart illustrating a method of submerging a wave energy system according to an example embodiment. In step 1201, the angular rotation of the drum housing 102 is determined when the drum housing 102 is turned or rotated around the shaft attachment 105a,b from a first position to a second position during wave movement, where the first position is reached when the drum housing 102 stops rotating by unwinding of the cable 104 from the cable reel in response to the float 101 being moved away from the submerged structure 106a by the upward movement of a wave, and where the second position is reached when the drum housing 102 stops rotating in the opposite direction by winding up the cable 104 on the cable reel 103 in response to the float 101 being moved closer to the submerged structure 106a by the following downward movement of the wave. If one or more determined angular rotation values equals or exceeds a predetermined rotation angle, then in step 1202, the torsion spring 510 is operatively connected to the drum housing 102 in the second mode of operation, and the cable 104 is further wound up on the cable 103 reel for submerging the float 101 into the sea, step 1203.

Thus, by measuring the angular variation between the centre shaft attachment 105a,b, which is fixed to the float 101, and the drum housing 102, the approximate wave height can be monitored, when the drum housing 102 turns forth and back in the waves, and it can be decided when the waves get so big that it is time to pull the buoy under water in storm protection mode.

In the following is given a list of materials and dimensions for an example of a wave energy conversion system or wave energy buoy representing a small buoy or float 101 with a peak power performance of around 300 W.

Materials and Dimensions for the Wave Energy Buoy:

The U-shape float or buoy 101 is made of glass reinforced polyester, GRP, and coated with weather and sea water resistant epoxy paint. The length of each "leg" in the U-shape is 900 mm, and the width of each leg is 300 mm. The gap width in the U-shape is minimum 300 mm and up to 900 mm depending on the length of the drum housing 102. For this example the width is 900 mm. The height of the legs and front part is 200 mm, and the curvature of front and, back and of the side parts (curvature of side parts or legs is optional) is formed by a half circle of diameter 200 mm, equals to the height of the buoy or float 101.

The material used for the shaft parts 105a, 505a, 105b, 505b is high grade stainless steel 316. Each shaft part 105a, 505a, 105b, 505b has a diameter of 30 mm and a length of 100 mm.

The material used for the drum housing 102 is sea resistant aluminium, and the diameter is 600 mm and the width is a bit less than 900 mm to fit into the U-shaped opening.

The material used for the cable reel 103 is a polyurethane, PU, elastomer. The outer reel diameter is 900 mm, and the inner reel diameter is 650 mm.

The material used for the outer part of the cable 104 is extra strong galvanized steel wire, and the diameter of the cable is 10 mm. The length of the cable can be in the range of 30 m to 200 m depending on the depth of the sea.

The total weight of buoy or float and drum housing is around 150 kg.

The larger ring gear 516 has an outer diameter of 500 mm, while the smaller first gear 515 has an outer diameter of 30 mm. The diameter of the two discs 511a, 511b holding the spring 510 is 580 mm The torsion spring 510 has a diameter of 550 mm, a width of 60 mm, and a spring force of 500 Nm.

The predetermined cable pre-tension may be set to 750N, and the length of the cable may be selected so that it requires between and 1½ turn of the cable reel 103 from start of tension in cable 104 to the desired pre-tension is reached. The torsion spring 510 may be arranged to reach a pre-tension of 250 Nm when the desired pre-tension of the cable 104 is reached.

During a normal wave-lift of 1 m waves, the drum housing 102 may turn +/−¼ turn forth and back.

The adjustment of the cable pre-tension is activated when the water level changes ¼ m.

A fully submerging of the buoy or float is activated when the wave heights exceed 3 m, and the drum housing 102 is turned 1½ revolution to submerge the buoy or float 101.

For the 300 W wave energy buoy having the above mentioned dimensions, the power production increases with the wave height, with the first results showing the following:

In 0.5 m waves=25 W.
In 1.0 m waves=100 W.
In 1.5 m waves=225 W.
In 2.0 m waves=400 W.

Larger wave energy buoys of respectively 2 kW, 5 kW, 10 kW and 20 kW, may be obtained by scaling in all three dimension to accommodate the higher power level, and the wave height is increased with the scaling factor. The scaling of respectively a factor of 3 and 4 represents a 2 kW and 5 kW wave energy buoy and the wave heights are scaled accordingly.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A wave energy conversion system, said system comprising:
    a float; and
    a power generation drum including a drum housing rotationally attached to the float by a shaft attachment;
    wherein the shaft attachment allows an at least partially rotational movement of the drum housing and the float relative to each other;
    wherein the drum housing comprises a cable reel with a cable having a first end part connected to the cable reel and a second end part, said cable reel being an integral part of or connected to the drum housing to rotate with the drum housing;
    wherein the drum housing further comprises a spring system, said spring system comprising a torsion spring with a first end part non-rotationally connected to the shaft attachment and a second end part operatively connected to the drum housing, wherein for at least one connection mode of operation a rotation of the drum housing builds up a tension in the spring, thereby applying a torque to the shaft attachment;
    wherein the second end part of the torsion spring is configured for being operatively connected to the drum housing in a first mode of operation to build up a tension in the spring by rotation of the drum housing in a direction for unwinding the cable from the cable reel and to rotate the drum housing in the opposite direction for winding up the cable on the cable reel by a release in the tension of the spring; and
    wherein the torsion spring is operatively connected to the drum housing for shifting between the first mode of operation and a second mode of operation, wherein for the second mode of operation the second end part of the spring is operatively connected to the drum housing for building up a tension in the spring by rotation of the drum housing in a direction for winding up the cable on the cable reel.

2. The energy conversion system according to claim 1, wherein the float is positioned in the sea by having the second end part of the cable attached to a submerged structure or to the sea bed.

3. The energy conversion system according to claim 2, wherein when the float is positioned in a substantially horizontal position on the sea, the cable extend from the cable reel to reach the submerged structure with the cable facing the front part of the float.

4. The energy conversion system according to claim 1, wherein the shaft attachment is fixedly connected to the float within an opening of the float with the drum housing rotationally arranged on the shaft attachment within said opening.

5. The energy conversion system according to claim 4, wherein the float comprises two oppositely arranged arms defining a part of said opening with the shaft attachment fixedly connected to the two arms.

6. The energy conversion system according to 5, wherein the float comprises a front part connecting the two arms, and wherein the shaft attachment is connected to the two arms with the drum housing rotationally arranged within said two arms.

7. The energy conversion system according to claim 6, wherein the float is substantially "U" shaped.

8. The energy conversion system according to claim 6, wherein said front part has an outer surface facing away from the drum, the combined drum and float has a centre of gravity, and the centre of the drum is located at a distance to the outer surface of the front part being larger than the distance from the gravity centre to the outer surface of the front part.

9. The energy conversion system according to claim 8, wherein the distance from the centre of the drum to the centre of gravity is at least 5% of the total length of the float when measured in the direction of the arms).

10. The energy conversion system according to claim 8, wherein the cable reel has a radius being larger than the distance between the centre of the drum and the centre of gravity.

11. The energy conversion system according to claim 1, wherein the drum is configured for winding up the cable on the cable reel in order to obtain a predetermined pre-tension of the cable when the float) is positioned in the sea by having the second end part of the cable attached to a submerged structure.

12. The energy conversion system according to claim 1, wherein the drum housing comprises the spring system and a gear system, said spring system comprising the torsion spring with the first end non-rotationally connected to the shaft and the second end operatively connected to the drum housing via the gear system, said gear system configured for being in a first, non-rotational mode of operation with the second end of the torsion spring held in a fixed position relative to the drum housing, and for being in a second, rotational mode of operation, in which the gear system is configured for rotating the drum housing relative to the shaft attachment and to the second end of the torsion spring.

13. The energy conversion system according to claim 12, wherein when in the rotational mode of operation, the gear system is configured for rotating the drum housing in a first direction relative to the shaft attachment for winding up the cable on the cable reel, and when a force is exerted on the cable reel and drum housing from a tension in the cable, said gear system is further configured for rotating the second end of the torsion spring in a second direction opposite to the first direction relative to the shaft attachment, said rotation of the second end of the torsion spring building up a tension in the spring and a torque to the shaft attachment.

14. The energy conversion system according to claim 12, wherein when the gear system is in the non-rotational mode of operation with the second end of the torsion spring held in a fixed position relative to the drum housing, the second end of the torsion spring follows a rotation of the drum housing, whereby a rotation of the drum housing in a direction of unwinding the cable from the cable reel builds up a tension in the spring and a torque to the shaft attachment.

15. The energy conversion system according to claim 12, wherein the gear system comprises a disc system with the second end of the torsion spring secured to said disc system, wherein the disc system is rotationally arranged relative to the shaft attachment and the drum housing, and wherein an outer peripheral part of the disc system holds a motor with a rotation axle, said rotation axle holding a first gear wheel engaging a second gear wheel fixedly connected to the drum housing wherein a rotation of said motor axle rotates the drum housing and the disc system holding the second end of the spring in opposite directions relative to each other.

16. The energy conversion system according to claim 15, wherein when the motor axle rotates in a first direction, the drum housing rotates in a first direction relative to the shaft attachment for winding up the cable on the cable reel, and when a force is exerted on the cable reel and drum housing from a tension in the cable, the disc system holding the second end of the spring rotates in a second direction opposite to the first direction relative to the shaft attachment, said rotation of the second end of the torsion spring building up a tension in the spring and a torque to the shaft attachment.

17. The energy conversion system according to claim 15, wherein the torsion spring is a clock spring, and wherein the disc system comprises two oppositely arranged discs with the clock spring arranged between said two discs.

18. The energy conversion system according to claim 15, wherein the second gear wheel is larger than the first gear wheel.

19. The energy conversion system according to claim 1, wherein the drum comprises a sensor system configured for sensing a torque on the shaft attachment.

20. The energy conversion system according to claim 19, wherein the sensor system comprises one or more strain gauges attached to the shaft attachment within the drum housing.

21. The energy conversion system according to claim 19, further comprising a control system configured for controlling rotation of the drum housing and winding of the cable reel based on the sensed torque.

22. The energy conversion system according to claim 21, wherein the control system is configured for controlling the operation mode of the gear system.

23. The energy conversion system according to claim 21, wherein the control system is configured for determining a cable tension based on the sensed torque and for controlling rotation of the drum housing and winding of the cable reel until a predetermined tension or pre-tension is determined for the cable.

24. The energy conversion system according to claim 23, wherein the control system is further configured for controlling rotation of the drum housing for winding up the cable on the cable reel for submerging the float into the sea, when one or more determined rotation angles equals or exceeds a predetermined rotation angle.

25. The energy conversion system according to claim 24, wherein the control system is further configured for determining the tension of the cable during the movement of several waves, comparing the obtained tension values with the predetermined pre-tension, and controlling rotation of the drum housing for winding and/or unwinding the cable on the cable reel for changing the pre-tension in the cable based on said comparison.

26. The energy conversion system according to claim 1, wherein the power generation drum comprises an electrical generator arranged within the drum housing for rotating or turning in response to a rotational movement of the drum housing.

27. The energy conversion system according to claim 26, wherein the electrical generator is arranged for rotating or turning in one direction only.

28. The energy conversion system according to claim 26, wherein the power generation drum further comprises a gear drive interconnecting the drum housing and the electrical generator.

29. The energy conversion system according to claim 28, wherein the gear drive comprises a speed-up gear.

30. The energy conversion system according to claim 28, wherein the gear drive comprises a unidirectional gear.

31. The energy conversion system according to claim 28, wherein the gear drive comprises a one-way clutch.

32. The energy conversion system according to claim 31, wherein the electrical generator, a speed-up gear, a unidirectional gear, and the one-way clutch are all centered for rotational movement about an axis defined by the shaft attachment.

33. The energy conversion system according to claim 1, wherein the drum comprises an angle detecting system configured for determining a rotation angle of the drum housing when the drum housing is turned or rotated around the shaft attachment from a first position to a second position.

34. The energy conversion system according to claim 33, wherein the first position is reached when the drum housing stops rotating by unwinding of the cable from the cable reel in response to the float being moved away from the submerged structure by the upward movement of a wave, and wherein the second position is reached when the drum housing stops rotating in the opposite direction by winding up the cable on the cable reel in response to the float being moved closer to the submerged structure by the following downward movement of the wave.

35. The energy conversion system according to claim 1, wherein the float is a buoy.

36. A wave energy conversion system comprising:
a float holding a power generation drum with a drum housing rotationally attached to the float by a shaft attachment, wherein the shaft attachment allows an at least partially rotational movement of the drum housing and the float relative to each other;
said drum housing comprising:
a cable reel with a cable having a first end part and a second end part, said first end part being connected to the cable reel, and said cable reel being an integral part of or connected to the drum housing to rotate with the drum housing;
a torsion spring operatively connected to the drum housing in a first mode of operation for building up a tension in the spring by rotation of the drum housing in a direction for unwinding the cable from the cable reel and for rotating the drum housing in the opposite direction for winding up the cable on the cable reel by a release in the tension of the spring; and
an electrical generator arranged for rotating or turning in response to a rotational movement of the drum housing, thereby producing electrical power;
wherein the torsion spring is operatively connected to the drum housing for shifting between the first mode of operation and a second mode of operation, wherein for the second mode of operation the spring is operatively connected to the drum housing for building up a tension in the spring by rotation of the drum housing in a direction for winding up the cable on the cable reel.

37. A method for generating electrical power from surface waves by use of an energy conversion system according to claim 36, said method comprising:
positioning the float in the sea by attaching the second end part of the cable to a submerged structure or to the sea bed;
arranging the torsion spring to be operatively connected to the drum housing in the second mode of operation;
winding up the cable on the cable reel to build up a pre-tension in the cable and the torsion spring;
arranging the torsion spring to be operatively connected to the drum housing in the first mode of operation;
allowing the drum housing to rotate in the direction of unwinding the cable from the cable reel in response to the float being moved away from the submerged structure by waves, said unwinding rotation of the drum housing increasing the tension of the spring and activating rotation of the electrical generator;
allowing the drum housing to rotate in the opposite direction in response to the cable being wound up on the cable reel by a release in the tension of the spring when the float is moved closer to the submerged structure by ocean waves, said winding rotation of the drum housing activating rotation of the electrical generator; and
extracting electrical power from the electrical generator.

38. The method of claim 37, wherein the extracted electrical power is stored in a battery.

39. The method according to claim 37, wherein the step of winding up the cable on the cable reel to build up the pre-tension in the cable and the torsion spring is performed until a predetermined cable tension is reached, said predetermined cable tension corresponding to the tension of the cable when the float is substantially half submerged into the sea.

40. The method according to claim 39, further comprising monitoring the tension of the cable during the movement of several waves, comparing the obtained tension values with the predetermined pre-tension, and when the difference between the mean value of the monitored tension and the predetermined pre-tension exceeds a predetermined value, a winding and/or unwinding of the cable on the cable reel is performed for changing the pre-tension in the cable.

41. The method according to claim 37, further comprising determining a rotation angle of the drum housing when the drum housing is turned or rotated around the shaft attachment from a first position to a second position,
wherein the first position is reached when the drum housing stops rotating by unwinding of the cable from the cable reel in response to the float being moved away from the submerged structure by the upward movement of a wave, and wherein the second position is reached when the drum housing) tops rotating in the opposite direction by winding up the cable on the cable reel in response to the float being moved closer to the submerged structure by the following downward movement of the wave.

42. The method according to claim 41, wherein a further winding up of the cable) on the cable reel is performed for submerging the float into the sea, when one or more determined rotation angles equals or exceeds a predetermined rotation angle.

43. A wave energy conversion system, said system comprising:
a float and a power generation drum with a drum housing rotationally attached to the float by a shaft attachment;
wherein the shaft attachment allows an at least partially rotational movement of the drum housing and the float relative to each other;

wherein the drum housing comprises a cable reel with a cable having a first end part connected to the cable reel and a second end part, said cable reel being an integral part of or connected to the drum housing to rotate with the drum housing;

wherein the drum housing further comprises a spring system, said spring system comprising a torsion spring with a first end part non-rotationally connected to the shaft attachment and a second end part operatively connected to the drum housing, wherein for at least one connection mode of operation a rotation of the drum housing builds up a tension in the spring, thereby applying a torque to the shaft attachment;

wherein the second end part of the torsion spring is configured for being operatively connected to the drum housing in a first mode of operation to build up a tension in the spring by rotation of the drum housing in a direction for unwinding the cable from the cable reel and to rotate the drum housing in the opposite direction for winding up the cable on the cable reel by a release in the tension of the spring;

wherein the torsion spring is operatively connected to the drum housing for shifting between the first mode of operation and a second mode of operation, wherein for the second mode of operation the second end part of the spring is operatively connected to the drum housing for building up a tension in the spring by rotation of the drum housing in a direction for winding up the cable on the cable reel;

wherein the shaft attachment is fixedly connected to the float within an opening of the float with the drum housing rotationally arranged on the shaft attachment within said opening;

wherein the float comprises two oppositely arranged arms defining a part of said opening with the shaft attachment fixedly connected to the two arms;

wherein the float comprises a front part connecting the two arms, and wherein the shaft attachment is connected to the two arms with the drum housing rotationally arranged within said two arms;

wherein said front part has an outer surface facing away from the drum, the combined drum and float has a centre of gravity, and the centre of the drum is located at a distance to the outer surface of the front part being larger than the distance from the gravity centre to the outer surface of the front part; and wherein the distance from the centre of the drum to the centre of gravity is at least 5% of the total length of the float when measured in the direction of the arms.

44. A wave energy conversion system, said system comprising:

a float and a power generation drum with a drum housing rotationally attached to the float by a shaft attachment;

wherein the shaft attachment allows an at least partially rotational movement of the drum housing and the float relative to each other;

wherein the drum housing comprises a cable reel with a cable having a first end part connected to the cable reel and a second end part, said cable reel being an integral part of or connected to the drum housing to rotate with the drum housing;

wherein the drum housing further comprises a spring system, said spring system comprising a torsion spring with a first end part non-rotationally connected to the shaft attachment and a second end part operatively connected to the drum housing, wherein for at least one connection mode of operation a rotation of the drum housing builds up a tension in the spring, thereby applying a torque to the shaft attachment;

wherein the second end part of the torsion spring is configured for being operatively connected to the drum housing in a first mode of operation to build up a tension in the spring by rotation of the drum housing in a direction for unwinding the cable from the cable reel and to rotate the drum housing in the opposite direction for winding up the cable on the cable reel by a release in the tension of the spring;

wherein the torsion spring is operatively connected to the drum housing for shifting between the first mode of operation and a second mode of operation, wherein for the second mode of operation the second end part of the spring is operatively connected to the drum housing for building up a tension in the spring by rotation of the drum housing in a direction for winding up the cable on the cable reel;

wherein the shaft attachment is fixedly connected to the float within an opening of the float with the drum housing rotationally arranged on the shaft attachment within said opening;

wherein the float comprises two oppositely arranged arms defining a part of said opening with the shaft attachment fixedly connected to the two arms;

wherein the float comprises a front part connecting the two arms, and wherein the shaft attachment is connected to the two arms with the drum housing rotationally arranged within said two arms;

wherein said front part has an outer surface facing away from the drum, the combined drum and float has a centre of gravity, and the centre of the drum is located at a distance to the outer surface of the front part being larger than the distance from the gravity centre to the outer surface of the front part; and wherein the cable reel has a radius being larger than the distance between the centre of the drum and the centre of gravity.

\* \* \* \* \*